(12) United States Patent
Kang et al.

(10) Patent No.: US 11,874,978 B2
(45) Date of Patent: Jan. 16, 2024

(54) ELECTRONIC DEVICE FOR RECOGNIZING STYLUS PEN AND METHOD OF OPERATING THE SAME

(71) Applicant: Samsung Electronics Co., Ltd., Gyeonggi-do (KR)

(72) Inventors: Byunghoon Kang, Gyeonggi-do (KR); Sanghui Park, Gyeonggi-do (KR); Changbyung Park, Gyeonggi-do (KR); Joohoon Lee, Gyeonggi-do (KR); Hyunsuk Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 471 days.

(21) Appl. No.: 16/978,123

(22) PCT Filed: Aug. 5, 2020

(86) PCT No.: PCT/KR2020/010324
§ 371 (c)(1),
(2) Date: Sep. 3, 2020

(87) PCT Pub. No.: WO2021/025457
PCT Pub. Date: Feb. 11, 2021

(65) Prior Publication Data
US 2022/0187930 A1 Jun. 16, 2022

(30) Foreign Application Priority Data

Aug. 6, 2019 (KR) .......................... 10-2019-0095799

(51) Int. Cl.
*G06F 3/038* (2013.01)
*G06F 3/0354* (2013.01)
(Continued)

(52) U.S. Cl.
CPC ............ *G06F 3/0383* (2013.01); *G06F 3/017* (2013.01); *G06F 3/02* (2013.01); *G06F 3/0346* (2013.01);
(Continued)

(58) Field of Classification Search
CPC .......... G06F 3/0383; G06F 3/017; G06F 3/02; G06F 3/0346; G06F 3/03545;
(Continued)

(56) References Cited

U.S. PATENT DOCUMENTS 10,042,439 B2 * 8/2018 Varlamov ........... G06F 3/03545
2012/0331546 A1 12/2012 Falkenburg et al.
(Continued)

FOREIGN PATENT DOCUMENTS

JP 2001-117685 4/2001
KR 1020060125375 12/2006
(Continued)

OTHER PUBLICATIONS

European Search Report dated Jul. 21, 2022 issued in counterpart application No. 20849884.0-1224, 11 pages.
(Continued)

*Primary Examiner* — Bryan Earles
(74) *Attorney, Agent, or Firm* — The Farrell Law Firm, P.C.

(57) ABSTRACT

An electronic device is provided, which includes a panel configured to identify a position of a stylus pen, a communication module configured to transmit/receive a communication signal to/from the stylus pen, and at least one processor configured to, based on detection of the stylus pen by the panel, perform a first operation based on the position of the stylus pen identified by the panel, based on non-detection of the stylus pen by the panel, identify at least one of information about the position of the stylus pen or informa-
(Continued)

tion indicating whether a button of the stylus pen is pressed, included in at least one communication signal received through the communication module from the stylus pen, and perform a second operation based on at least one of the information about the position of the stylus pen or the information indicating whether the button of the stylus pen is pressed.

20 Claims, 24 Drawing Sheets

(51) Int. Cl.
| | | |
|---|---|---|
| *G06F 3/01* | (2006.01) | |
| *G06F 3/0346* | (2013.01) | |
| *G06F 3/02* | (2006.01) | |
| *G06F 3/044* | (2006.01) | |
| *G06F 3/046* | (2006.01) | |

(52) U.S. Cl.
CPC .......... *G06F 3/03545* (2013.01); *G06F 3/046* (2013.01); *G06F 3/0442* (2019.05); *G06F 2203/0384* (2013.01)

(58) Field of Classification Search
CPC .................. G06F 3/0442; G06F 3/046; G06F 2203/0384; G06F 2200/1632; G06F 1/1656; G06F 1/1694; G06F 1/1698; G06F 3/04883; G06F 3/038; G06F 3/0416; G06F 3/04812
See application file for complete search history.

(56) References Cited

U.S. PATENT DOCUMENTS

| | | | |
|---|---|---|---|
| 2013/0207938 A1* | 8/2013 | Ryshtun | G06F 3/0441 |
| | | | 178/19.03 |
| 2014/0055426 A1 | 2/2014 | Park et al. | |
| 2014/0125636 A1 | 5/2014 | Kwon et al. | |
| 2014/0192030 A1* | 7/2014 | Ryshtun | G06F 3/03545 |
| | | | 345/179 |
| 2014/0210744 A1 | 7/2014 | Song et al. | |
| 2015/0002457 A1 | 1/2015 | Woo et al. | |
| 2015/0065200 A1* | 3/2015 | Namgung | G06F 3/04162 |
| | | | 345/173 |
| 2015/0130758 A1* | 5/2015 | Chang | G06F 3/04162 |
| | | | 345/174 |
| 2015/0234528 A1 | 8/2015 | Choi et al. | |
| 2016/0139690 A1* | 5/2016 | Chang | G06F 3/0338 |
| | | | 345/179 |
| 2016/0306448 A1* | 10/2016 | Fleck | G06F 3/0383 |
| 2017/0285772 A1* | 10/2017 | Yamamoto | G06F 3/04162 |
| 2019/0042006 A1 | 2/2019 | Hsieh et al. | |
| 2020/0019255 A1* | 1/2020 | Gilbert | G06F 3/03545 |
| 2020/0081560 A1* | 3/2020 | Geller | G06F 1/3259 |

FOREIGN PATENT DOCUMENTS

| | | |
|---|---|---|
| KR | 1020140026966 | 3/2014 |
| KR | 1020140096752 | 8/2014 |
| KR | 1020140109062 | 9/2014 |
| KR | 1020150001957 | 1/2015 |

OTHER PUBLICATIONS

International Search Report dated Oct. 29, 2020 issued in counterpart application No. PCT/KR2020/10324, 10 pages.

* cited by examiner

ELECTRONIC DEVICE FOR RECOGNIZING STYLUS PEN AND METHOD OF OPERATING THE SAME

PRIORITY

This application is a National Phase Entry of International Application No. PCT/KR2020/010324, which was filed on Aug. 5, 2020, and claims priority to Korean Patent Application No. 10-2019-0095799 filed in the Korean Intellectual Property Office on Aug. 6, 2019, the content of each of which is incorporated herein by reference.

TECHNICAL FIELD

The disclosure relates generally to an electronic device for recognizing a stylus pen and a method of operating the same.

BACKGROUND ART

Electronic devices may receive various inputs from users through specified input devices (e.g., pen input devices or stylus pens) connected with the electronic devices via wireless communication. An electronic device may identify a designated position on an electronic device with a stylus pen. The electronic device may perform a function corresponding thereto.

The electronic device may detect magnetic fields produced from the stylus pen using electro magnetic resonance (EMR). The electronic device may identify the position of the stylus pen based on an electromotive force generated by a magnetic field per channel.

The stylus pen may be connected with the electronic device via short-range communication (e.g., Bluetooth™ low energy (BLE)). The stylus pen may transmit information about a pressing state of a button on the housing of the stylus pen to the electronic device via short-range communication. The electronic device may perform a designated operation based on the received information.

DISCLOSURE

Technical Problem

The electronic device may perform the designated operation depending on whether the stylus pen button is pressed. However, when a command is transmitted depending on an on/off state of the stylus pen button, only a few electronic device operations may be matched to the on/off state of the stylus pen button and be executed. Accordingly, an application supporting various operations based on a stylus pen may be difficult to effectively control.

According to an embodiment, an electronic device is provided, which includes a panel (e.g., a digitizer or a touch panel) capable of identifying the position of a stylus pen and a communication module. When the stylus pen is positioned within a recognition range of the panel, the position of the stylus pen is identified according to a result of panel processing. When the stylus pen is positioned outside the recognition range of the panel, the position of the stylus pen may be identified according to a communication signal received via the communication module. By being able to identify the position of the pen outside the panel's recognition range, a function corresponding to a gesture may be performed, and additional manipulations by the stylus pen, e.g., a mouse function of moving a cursor, are possible.

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

In accordance with an embodiment, an electronic device is provided, which includes a panel configured to identify a position of a stylus pen, a communication module configured to transmit and receive communication signals to and from the stylus pen, and at least one processor configured to based on detection of the stylus pen by the panel, perform a first operation based on the position of the stylus pen identified by the panel, based on non-detection of the stylus pen by the panel, identify, from at least one communication signal received through the communication module from the stylus pen, at least one of information about the position of the stylus pen or information indicating whether a button of the stylus pen is pressed, and perform a second operation based on the at least one of the information about the position of the stylus pen or the information indicating whether the button of the stylus pen is pressed.

In accordance with an embodiment, a stylus pen is provided, which includes a button, a resonance circuit including a coil and at least one capacitor, at least one sensor configured to sense at least one of a movement of the stylus pen, an orientation of the stylus pen, or a direction of the stylus pen, a communication module, and at least one control circuit configured to based on non-identification of a transmission signal from a panel of an electronic device, identify whether the button is pressed, identify information about a position of the stylus pen based on data sensed by the at least one sensor, based on a pressing of the button, and control the communication module to transmit at least one communication signal including at least one of information about the position of the stylus pen or information indicating whether the button is pressed, and wherein upon identifying the transmission signal from the panel of the electronic device, the at least one communication signal is not transmitted.

It is an aim of certain embodiments of the invention to solve, mitigate or obviate, at least partly, at least one of the problems and/or disadvantages associated with the prior art. Certain embodiments aim to provide at least one of the advantages described below.

Advantageous Effects

In accordance with various embodiments, an electronic device includes a panel (e.g., a digitizer or touch panel)

capable of identifying the position of a stylus pen and a communication module. When the stylus pen is positioned within a range in which the panel may recognize it, the electronic device and method of operating the same identify the position of the stylus pen according to the result of panel processing. When the stylus pen is positioned outside the range in which the panel may recognize it, the electronic device and method of operating the same identify the position of the stylus pen according to a communication signal received via the communication module. By being able to identify the position of the pen outside the recognizable range, a function corresponding to a gesture may be performed, and additional manipulation by the stylus pen of the mouse function of moving the cursor may be possible.

DESCRIPTION OF DRAWINGS

The above and other aspects, features, and advantages of certain embodiments of the disclosure will be more apparent from the following description taken in conjunction with the accompanying drawings, in which:

FIGS. 15A and 51B illustrate processes of terminating an air mouse according to various embodiments;

MODE FOR INVENTION

Various embodiments of the disclosure are described below with reference to the detailed description and accompanying drawings. Descriptions of well-known functions and/or configurations are omitted for the sake of clarity and conciseness.

Figure 1:
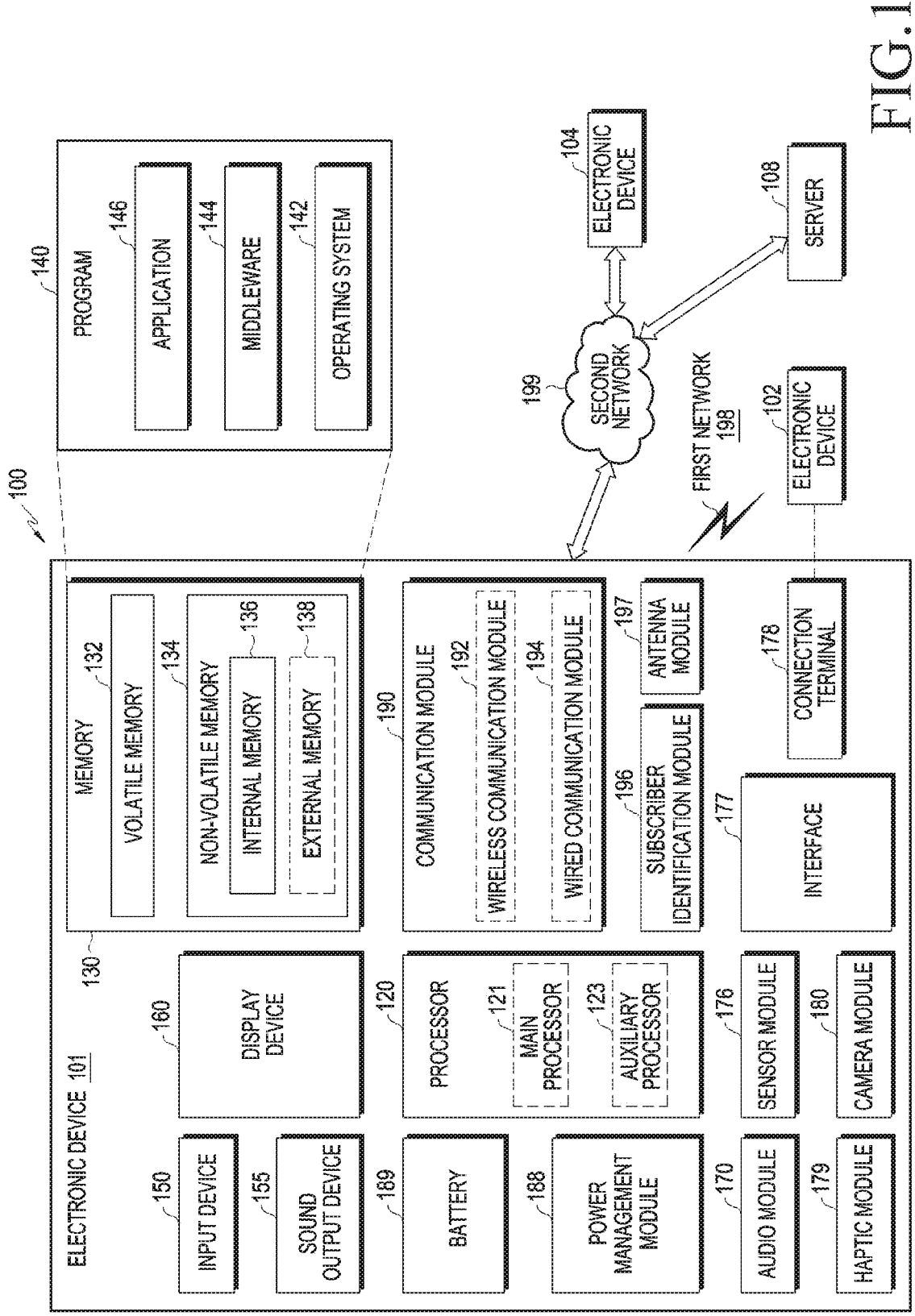
FIG. 1 illustrates an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (STM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIDI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108, For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
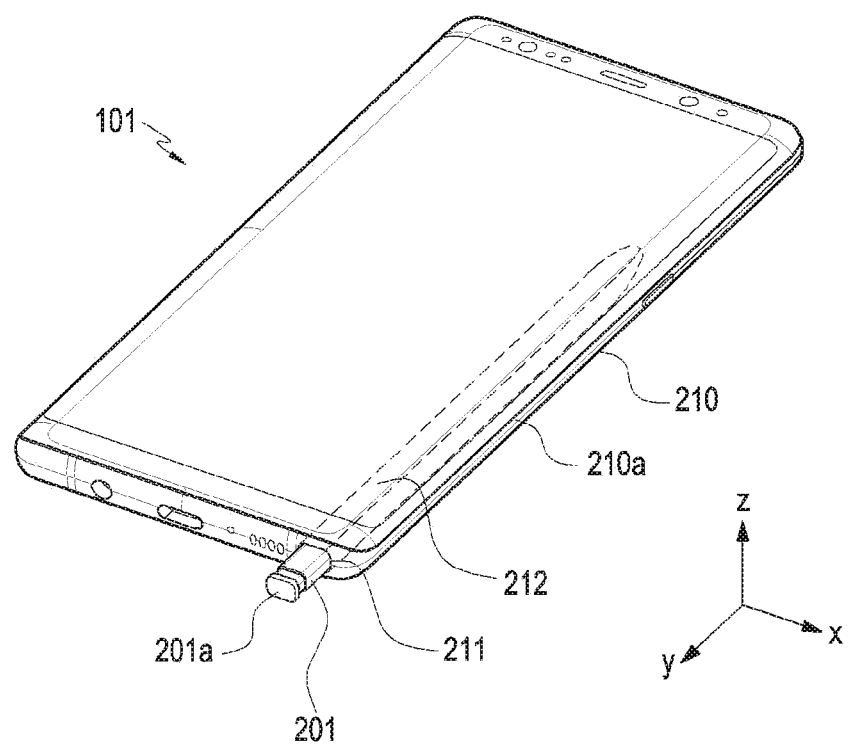
FIG. 2 illustrates an electronic device including a stylus pen according to an embodiment.

FIG. 2 illustrates an electronic device 101 including a stylus pen 201 according to an embodiment.

Referring to FIG. 2, the electronic device 101 may have a structure in which the stylus pen 201 may be inserted. The electronic device 101 may include a housing 210, and a hole 211 may be formed in a portion of the housing 210, e.g., a portion of a side surface 210a. The electronic device 101 may include a first inner space 212, which is a storage space connected with the hole 211 and the stylus pen 201 may be inserted into the first inner space 212. The stylus pen 201 may have a pressable first button 201a at an end thereof to be easily pulled out of the first inner space 212 of the electronic device 101. When the first button 201a is pressed, a repulsive mechanism (e.g., at least one elastic member, e.g., a spring) configured in association with the first button 201a may be operated to at least partially eject the stylus pen 201 from the first inner space 212.

Figure 3A:
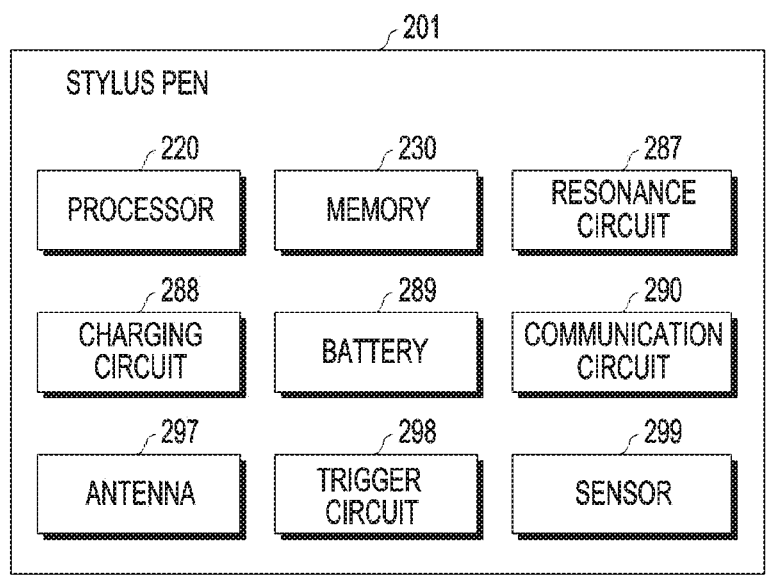
FIG. 3A illustrates a stylus pen according to an embodiment.

FIG. 3A illustrates a stylus pen according to an embodiment.

Referring to FIG. 3A, the stylus pen 201 may include a processor 220, a memory 230, a resonance circuit 287, a charging circuit 288, a battery 289, a communication circuit 290, an antenna 297, a trigger circuit 298, and/or a sensor 299. According to an embodiment, the processor 220, at least part of the resonance circuit 287, and/or at least part of the communication circuit 290 of the stylus pen 201 may be configured in the form of a chip or on a printed circuit board. The processor 220, the resonance circuit 287, and/or the communication circuit 290 may be electrically connected with the memory 230, the charging circuit 288, the battery 289, the antenna 297, the trigger circuit 298, and/or the sensor 299.

The processor 220 may include a customized hardware module or a generic processor configured to execute software (e.g., an application program). The processor 220 may include a hardware component (function) or software element (program) including at least one of a communication module or a module to manage the state or environment of the stylus pen 201, an input/output interface, a data measuring module, and various sensors provided in the stylus pen 201. The processor 220 may include a hardware module, a software module, a firmware module, or a combination of two or more thereof. The processor 220 may be configured to transmit, through the communication circuit 290, to the electronic device 101, information indicating a pressing state of a button, sensing information obtained by the sensor 299, and/or information (e.g., information associated with the position of the stylus pen 201) calculated based on the sensing information.

The resonance circuit 287 may resonate based on an electromagnetic field signal generated from a digitizer (e.g., the display device 160) of the electronic device 101 and may radiate an electromagnetic resonance (EMR) input signal (or magnetic field) by the resonance. The electronic device 101 may identify the position of the stylus pen 201 over the electronic device 101 using the EMR input signal. For example, the electronic device 101 may identify the position of the stylus pen 201 based on the magnitude of the electromotive force (e.g., output current) generated by the EMR input signal at each of a plurality of channels (e.g., a plurality of loop coils) in the digitizer.

Although the electronic device 101 and the stylus pen 201 are described herein as being operated based on the EMR scheme, this is merely an example and the disclosure is not limited thereto. For example, the electronic device 101 may generate an electrical field-based signal based on an electrically coupled resonance (ECR) scheme. The resonance circuit of the stylus pen 201 may be resonated by the electric field. The electronic device 101 may identify the electric potential at the plurality of channels (e.g., electrodes) by the resonance of the stylus pen 201 and may identify the position of the stylus pen 201 based on the electric potential. The stylus pen 201 may also be implemented in an active electrostatic (AES) scheme, and it will be appreciated by one of ordinary skill in the art that the disclosure is not limited to a specific kind of implementation. Further, the electronic device 101 may detect the stylus pen 201 based on a variation in capacitance (e.g., self capacitance or mutual capacitance) associated with at least one electrode of the touch panel. In this case, the stylus pen 201 may not include the resonance circuit. In the disclosure, the term "panel" or "sensing panel" may collectively refer to a digitizer and touch screen panel (TSP).

The memory 230 may store information related to the operation of the stylus pen 201. For example, the information may include information for communicating with the electronic device 101 and frequency information related to the input operation of the stylus pen 201, The memory 230 may store a program (or application, algorithm, or processing loop) for calculating information (e.g., coordinate information and/or displacement information) about the position of the stylus pen 201 from the sensing data obtained by the sensor 299. The memory 230 may store the communication stack of the communication circuit 290. The communication circuit 290 and/or processor 220 may include a dedicated memory.

The resonance circuit 287 may include a coil (or inductor) and/or capacitor. The resonance circuit 287 may be resonated based on an input electric field and/or magnetic field (e.g., an electric field and/or magnetic field generated from the digitizer of the electronic device 101). When the stylus pen 201 transmits signals via the EMR scheme, the stylus pen 201 may generate a signal having a resonance frequency based on an electromagnetic field generated from the inductive panel of the electronic device 101. When the stylus pen 201 transmits signals via the AES scheme, the stylus pen 201 may generate a signal using a capacitive coupling with the electronic device 101. When the stylus pen 201 transmits signals via the ECR scheme, the stylus pen 201 may generate a signal having a resonance frequency based on an electric field generated from a capacitive device of the electronic device.

The resonance circuit 287 may be used to vary the frequency or strength of electromagnetic field according to the user's manipulation state. For example, the resonance circuit 287 may provide various frequencies to recognize a hovering input, a drawing input, a button input, or an erasing input. For example, the resonance circuit 287 may provide various resonance frequencies according to combinations of connections of a plurality of capacitors or based on a variable inductor and/or variable capacitor.

When connected with the resonance circuit 287 based on a switching circuit, the charging circuit 288 may rectify a resonance signal generated from the resonance circuit 287 into a direct current (DC) signal and provide the DC signal to the battery 289. The stylus pen 201 may identify whether the stylus pen 201 is inserted into the electronic device 101 using a voltage level of a DC signal sensed by the charging circuit 288. Alternatively, the stylus pen 201 may identify the pattern corresponding to the signal identified by the charging circuit 288, thereby identifying whether the stylus pen 201 has been inserted.

The battery 289 may be configured to store power for operating the stylus pen 201. The battery 289 may include a lithium-ion battery or a capacitor, and may be recharged or replaced. The battery 289 may be charged with power (e.g., DC signal (DC power)) received from the charging circuit 288.

The communication circuit 290 may be configured to perform wireless communication between the stylus pen 201 and the communication module 190 of the electronic device 101. The communication circuit 290 may transmit state information about the stylus pen 201, input information, and/or position-related information to the electronic device 101 using a short-range communication scheme. For example, the communication circuit 290 may transmit direction information (e.g., motion sensor data) about the stylus pen 201 obtained through the trigger circuit 298, voice information entered through the microphone, or remaining power information about the battery 289 to the electronic device 101. The communication circuit 290 may transmit the sensing data obtained from the sensor 299 and/or information associated with the position of the stylus pen 201, identified based on the sensing data, to the electronic device 101. The communication circuit 290 may transmit information about the state of a button 337 of the stylus pen 201 to the electronic device 101. The short-range communication scheme may include, but is not limited in kind to, Bluetooth, Bluetooth low energy (BLE), near-field communication (NEC), or wireless-fidelity (Wi-Fi) direct.

The antenna 297 may be used to transmit signals or power to the outside (e.g., the electronic device 101) or receive signals or power from the outside. The stylus pen 201 may include a plurality of antennas 297 and select at least one antenna 297 appropriate for the communication scheme from among the plurality of antennas. The communication circuit 290 may exchange signals or power with an external electronic device through the at least one selected antenna 297.

The trigger circuit 298 may include at least one button or sensor circuit. The processor 220 may identify the input scheme (e.g., a touch or press) or kind of the button (e.g., EMR button or BLE button) of the stylus pen 201. The trigger circuit 298 may transmit a trigger signal to the electronic device 101 using a signal through a sensor 299 or a button input signal.

The sensor 299 may include an accelerometer, a gyro sensor, and/or a geomagnetic sensor. The accelerometer may sense linear movement of the stylus pen 201 and/or information about the acceleration on the three axes of the stylus pen 201. The gyro sensor may sense information related to the rotation of the stylus pen 201. The geomagnetic sensor may sense information about the direction of the stylus pen 201 in an absolute coordinate system. The sensor 299 may include a sensor capable of generating an electric signal or data value corresponding to the internal operation status or external environment of the stylus pen 201, such as a remaining battery capacity sensor, pressure sensor, optical sensor, temperature sensor, or biometric sensor, as well as the sensor for measuring the movement. The processor 220 may transmit the information obtained from the sensor 299 through the communication circuit 290 to the electronic device 101. The processor 220 may transmit information (e.g., the coordinates of the stylus pen 201 and/or the displacement of the stylus pen 201) associated with the position of the stylus pen 201 based on the information obtained from the sensor 299 through the communication circuit 290 to the electronic device 101.

Figure 3B:
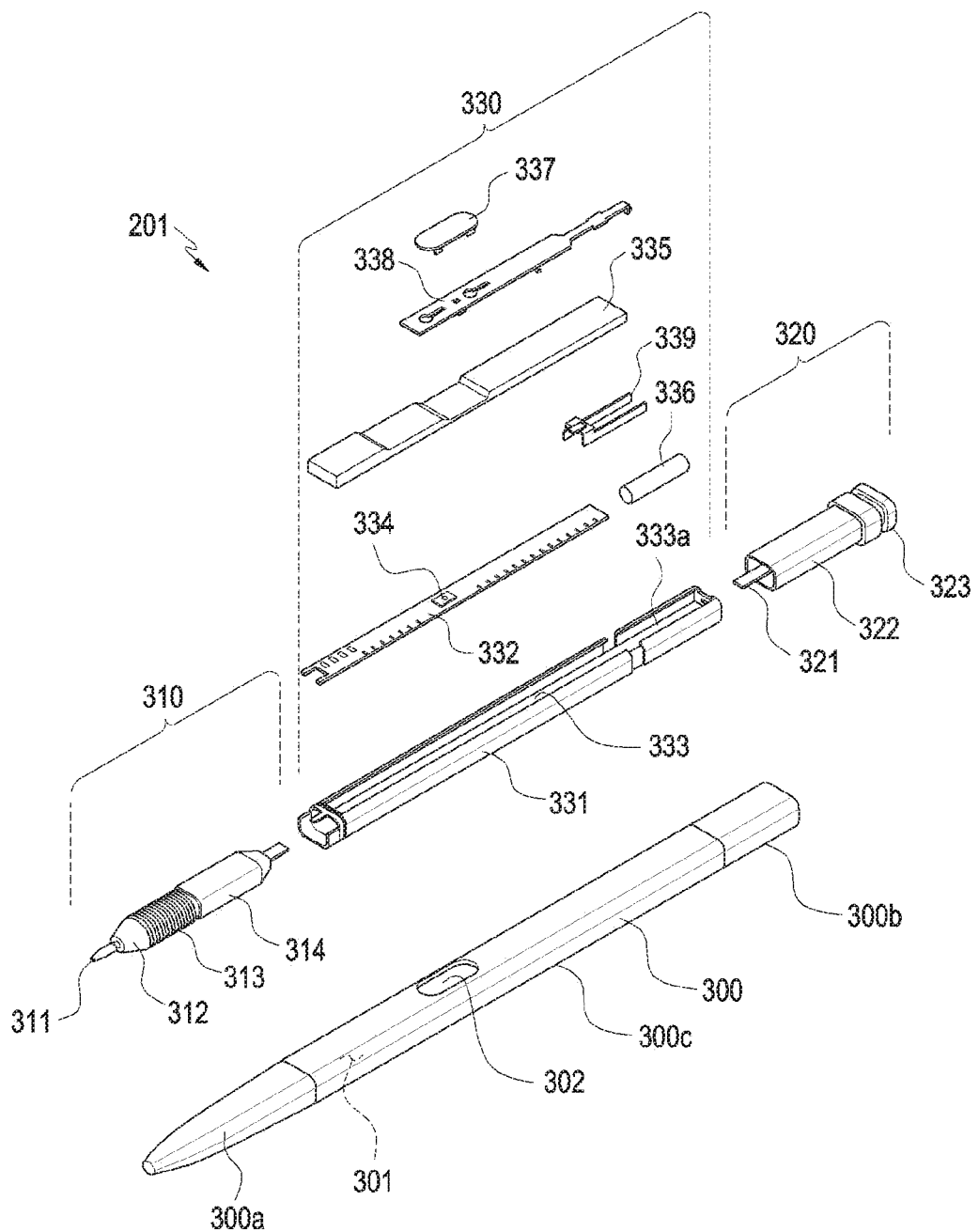
FIG. 3B illustrates a stylus pen according to an embodiment.

FIG. 3B illustrates a stylus pen according to an embodiment.

Referring to FIG. 3B, the stylus pen 201 may include a pen housing 300 forming the outer appearance of the stylus pen 201 and an inner assembly inside the pen housing 300. The inner assembly may be inserted into the pen housing 300, with several parts mounted inside the stylus pen 201 assembled together, by a single assembly operation.

The pen housing 300 may include an elongate second internal space 301 between a first end 300a and a second end 300b. The cross section of the pen housing 300 may be shaped as an ellipse with a longer axis and a shorter axis and may overall be shaped as an elliptical cylinder. As described above in connection with FIG. 2, the first inner space 212 of the electronic device 101 may have an elliptical cross section corresponding to the shape of the pen housing 300. The pen housing 300 may at least partially include a synthetic resin (e.g., plastic) and/or a metal (e.g., aluminum). The first end 300a of the pen housing 300 may be formed of a synthetic resin. Other various embodiments may be applied to the material of the pen housing 300.

The inner assembly may be elongated corresponding to the shape of the pen housing 300. The inner assembly may largely be divided into three components along the lengthwise direction. The inner assembly may include a coil part 310 disposed in a position corresponding to the first end 300a of the pen housing 300, an ejection member 320 disposed in a position corresponding to the second end 300b of the pen housing 300, and a circuit board part 330 disposed in a position corresponding to the body of the pen housing 300.

The coil part 310 may include a pen tip 311, which is exposed to the outside of the first end 300b when the inner assembly is fully inserted into the pen housing 300, a packing ring 312, a coil 313 wound multiple times, and/or a pen pressure sensor 314 to obtain variations in pressure when the pen tip 311 is pressurized. The packing ring 312 may include epoxy, rubber, urethane, or silicone. The packing ring 312 may be provided for waterproof or dustproof purposes and protect the coil part 310 and the circuit board part 330 from water or dust. The coil 313 may form a resonance frequency within a preset frequency band (e.g., 500 kHz) and may be combined with at least one device (e.g., a capacitor) to adjust the resonance frequency produced by the coil 313 within a predetermined range.

The ejection member 320 may include a configuration to pull the stylus pen. 201 out of the first inner space 212 of the electronic device 101. The ejection member 320 may include a shaft 321, an ejection body 322 disposed around the shaft 321 to form the overall outer appearance of the ejection member 320, and a button part 323 (e.g., the first button 201a of FIG. 2). When the inner assembly is fully inserted into the pen housing 300, the portion including the shaft 321 and the ejection body 322 may be surrounded by the second end 300b of the pen housing 300, and at least part of the button part 323 may be exposed to the outside of the second end 300b. A plurality of parts, e.g., cam members or elastic members, may be disposed in the ejection body 322 to form a push-pull structure. The button part 323 may substantially be coupled with the shaft 321 to linearly move back and forth along the ejection body 322. The button part 323 may include a button with a jaw to allow the user to pull out the stylus pen 201 with her fingernail. The stylus pen 201 may include a sensor to detect the linear motion of the shaft 321 to thereby provide another input scheme.

The circuit board part 330 includes a printed circuit board 332, a base 331 surrounding at least one surface of the printed circuit board 332, and an antenna. A board seating part 333 may be formed on top of the base 331 to allow the printed circuit board 332 to rest, and the printed circuit board 332 may be seated and fastened onto the board seating part 333. The printed circuit board 332 may include a first surface and a second surface. A variable capacitor or a switch 334, which is connected with the coil 313, may be disposed on the first surface, and a charging circuit, a battery 336, or a communication circuit may be disposed on the second surface. The first surface and the second surface of the printed circuit board 332 may denote different surfaces stacked one over another, and in other embodiments, the first surface and the second surface may refer to different portions of the printed circuit board which are disposed along the lengthwise direction of the printed circuit board 332. The battery 336 may include an electric double layered capacitor (EDLC). The charging circuit may be positioned between the coil 313 and the battery and may include a voltage detector circuit and a rectifier. The battery 336 may not necessarily be disposed on the second surface of the printed circuit board 332. Instead, the position of the battery 336 may be set differently depending on various mounting structures of the circuit board 330 and therefore, may differ from the position shown in the drawings.

The antenna may include an antenna structure 339 as illustrated in FIG. 3B and/or an antenna embedded in the printed circuit board 332. A switch 334 is provided on the printed circuit board 332. A second button 337 provided to the stylus pen 201 may be used to press the switch 334 and may be exposed to the outside through a side opening 302 of the pen housing 300. The second button 337 may be supported by the supporting member 338 and, if no external force is applied to the second button 337, the supporting member 338 may provide an elastic restoration force to allow the second button 337 to remain or go back to a predetermined position. The second button 337 may be implemented as any one of a physical key, touch key, motion key, pressure key, or keyless, but not limited to a specific type of implementation.

The circuit board part 330 may include a packing ring, such as an O-ring. O-rings may be disposed at both ends of the base 331, thereby forming a sealing structure between the base 331 and the pen housing 300-1. The supporting member 338 may partially come in tight contact with the inner wall of the pen housing 300 around the side opening 302, thereby forming a sealing structure. For example, at least part of the circuit board part 330 may also include a waterproof, dustproof structure similar to the packing ring 312 of the coil part 310.

The stylus pen 201 may include a battery seating part 333a on the top surface of the base 331 to allow the battery 336 to sit thereon. The battery 336 mountable on the battery seating part 333a may include, e.g., a cylinder-type battery.

The stylus pen 201 may include a microphone and/or speaker. The microphone and/or speaker may be connected directly to the printed circuit board 332 or to a separate flexible printed circuit board (FPCB) connected with the printed circuit board 332. The microphone and/or speaker may be disposed in a position parallel with the second button 337 along the longer direction of the stylus pen 301.

Figure 4:
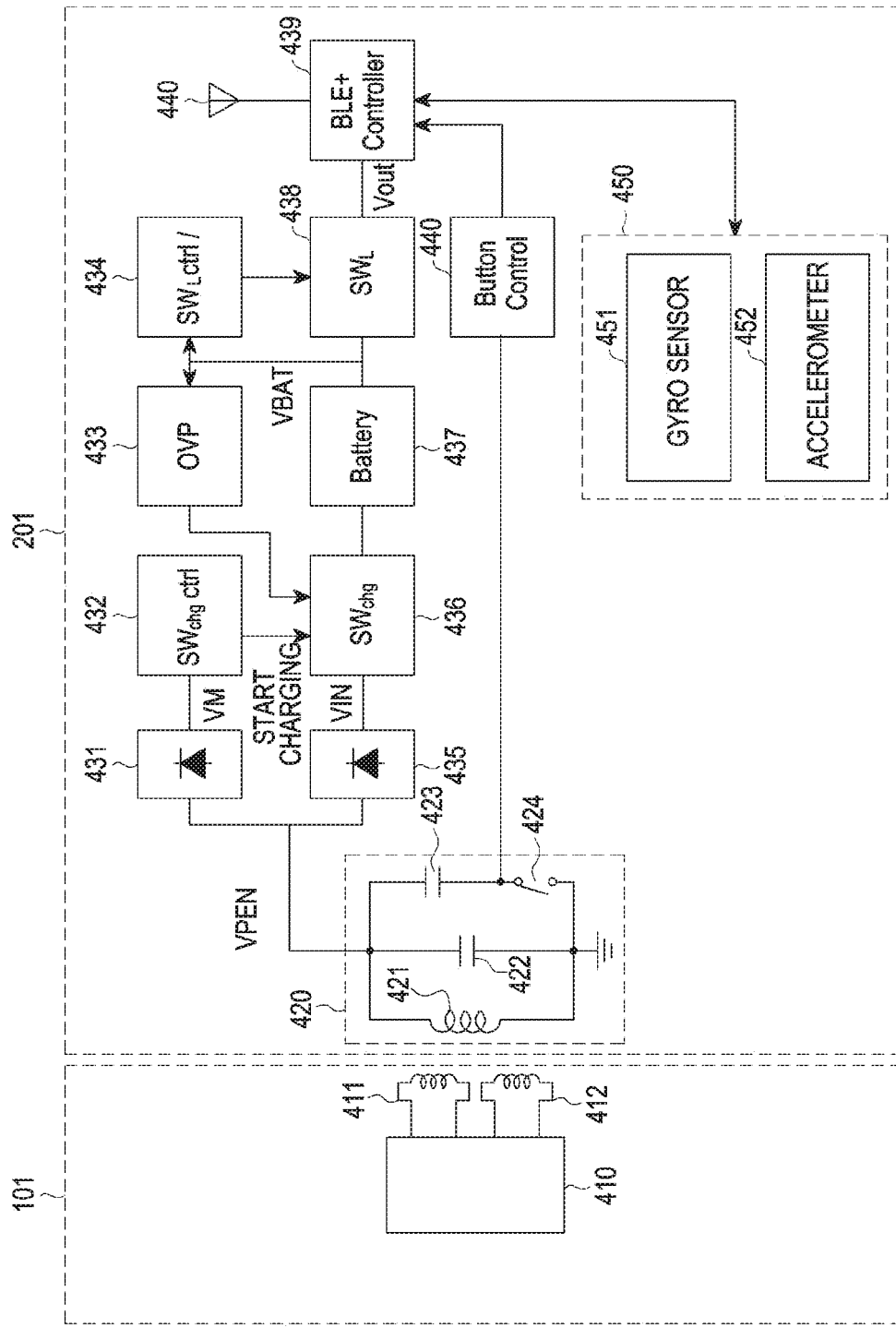
FIG. 4 illustrates an electronic device and stylus pen according to an embodiment.

FIG. 4 illustrates an electronic device and stylus pen according to an embodiment.

Referring to FIG. 4, an electronic device 101 may include a pen controller 410. The pen controller 410 may include at least one coil 411 and 412 and may provide charging power to a stylus pen 201 via at least one of the coils 411 and 412. The coils 411 and 412 may be positioned adjacent to the coil 421 of the stylus pen 201 when the stylus pen 201 is in the receiving space of the electronic device 101, but the position of the coils 411 and 412 is not limited thereto.

Insertion of the stylus pen 201 into the receiving space is merely an example. For example, the electronic device 101 may have an area (or space) where the stylus pen 201 may be mounted (or attached) in which case the stylus pen 201 may be attached to or detached from the area (or space). In this disclosure, it will be easily appreciated by one of ordinary skill in the art that the operations that are performed when the stylus pen 201 is positioned in the receiving space may also be performed when the stylus pen 201 is attached to a mounting area (or space). At least some functions of the pen controller 410 may be performed by the processor 120, or the pen controller 410 and the processor 120 may be integrated together to perform at least some functions. When the pen controller 410 performs a specific operation, the specific operation may actually, be performed by the processor 120 or by a control circuit independent from the processor 120. The pen controller 410 may include a control circuit (e.g., a control circuit independent from the processor 120), an inverter, and/or an amplifier, as well as the at least one coil 411 and 412. The pen controller 410 may include no control circuit, such that a signal for charging may be provided to the coils 411 and 412 under the control of the processor 120.

The pen controller 410 may provide a signal with a pattern via the at least one coil 411 and 412. The pattern may be previously shared with the stylus pen 201 for controlling the stylus pen 201 and may include a charging initiation indication pattern, a charging termination indication pattern, and/or a detection pattern. Although two coils 411 and 412 are illustrated in FIG. 4, this is merely an example, and the number of coils is not limited thereto.

The resonance circuit 420 of the stylus pen 201 may include a coil 421, at least one capacitor 422 and 423, and/or a switch 424. When the switch 424 is in an off state, the coil 421 and the capacitor 422 may form a resonance circuit and, when the switch 424 is in an on state, the coil 421 and the capacitors 422 and 423 may form a resonance circuit. Thus, the resonance frequency of the resonance circuit 420 may vary depending on the on/off state of the switch 424. For example, the electronic device 101 may identify the on/off state of the switch 424 based on the frequency of a signal from the stylus pen 201. When the button 337 of the stylus pen 201 is pressed/released, the switch 424 may be turned on/off, and the electronic device 101 may identify whether the button 337 of the stylus pen 201 is pressed based on the frequency of a reception signal identified via the digitizer.

A at least one rectifier 431 and 435 may rectify an alternating current (AC) waveform of signal (VPEN) output from the resonance circuit 420 and output the rectified signal. The charging switch controller ($SW_{chg}$ ctrl) 432 may receive the rectified signal (VM) output from the rectifier 431, Based on the rectified signal, the charging switch controller 432 may identify whether the signal generated from the resonance circuit is a signal for charging or a signal for detecting the position. For example, the charging switch controller 432 may identify whether the signal generated from the resonance circuit is a signal for charging or a signal for detecting the position based on the magnitude of the voltage of the rectified signal. The charging switch controller 432 may identify whether a signal with a charging initiation pattern is input based on the waveform of the rectified signal.

Upon identifying that that the signal is a signal for charging, the charging switch controller 432 may turn on the charging switch $SW_{chg}$ 436. Upon detecting a signal with the charging initiation pattern, the charging switch controller 432 may turn on the charging switch $SW_{chg}$ 436. The charging switch controller 432 may transfer a charging initiation signal (chg_on) to the charging switch 436. In this case, the rectified signal (YIN) may be transferred through the charging switch 436 to a battery 437. The battery 437 may be charged with the received rectified signal. An over-voltage protection circuit (OVP) 433 may identify the battery voltage (VBAT) and, when the battery voltage exceeds an over-voltage threshold, turn off the charging switch 436.

A load switch controller ($SW_L$ ctrl) 434, upon identifying that the battery voltage exceeds an operation voltage threshold, may turn on a load switch ($SW_L$) 438. When the load switch 438 turns on, power from the battery 437 may be transferred to the BLE communication circuit and controller (BLE+controller) 439. The BLE communication circuit and controller 439 may be operated using the received power.

When the distance between the stylus pen 201 and the electronic device 101 is larger than a threshold distance, a button control circuit 440 may transfer information about an input of the button 337 to the BLE communication circuit and controller 439. The BLE communication circuit and controller 439 may transmit the received button input information through the antenna 441 to the electronic device 101.

A sensor 450 may include a gyro sensor 451 and/or an accelerometer 452. Sensing data obtained by the gyro sensor 451 and/or the accelerometer 452 may be transferred to the BLE communication circuit and controller 439. The BLE communication circuit and controller 439 may transmit a communication signal including the received sending data through the antenna 441 to the electronic device 101. The BLE communication circuit and controller 439 may identify information associated with the position of the stylus pen 201 (e.g., the coordinates and/or displacement of the stylus pen 201) identified based on the received sending data. The BLE communication circuit and controller 439 may transmit the identified information associated with the position of the stylus pen 201 through the antenna 441 to the electronic device 101.

When the stylus pen 201 is removed from the electronic device 101, the BLE communication circuit and controller 439 may activate the accelerometer 452, When the button is pressed, the BLE communication circuit and controller 439 may activate the gyro sensor 451. The time of activation is merely an example, and no limitation is posed on the time of activation per sensor. Further, the sensor 450 may further include a geomagnetic sensor. When only the accelerometer 452 is activated, the stylus pen 201 may provide acceleration information measured by the accelerometer 452 to the electronic device 101, and the electronic device 101 may be operated based on both the acceleration information and the position of the stylus pen 201 identified based on the pen signal.

Figure 5:
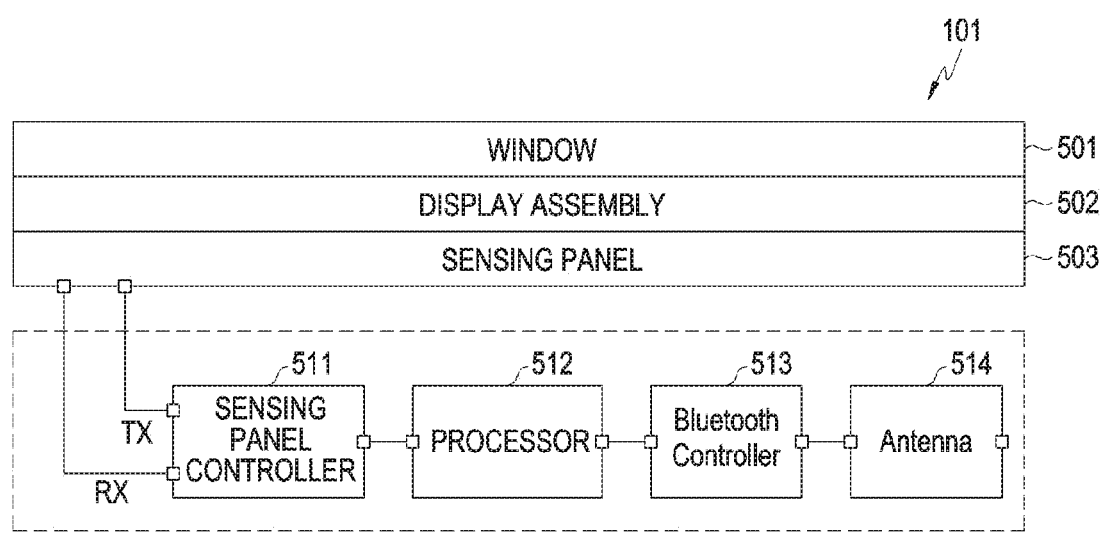
FIG. 5 illustrates an electronic device according to an embodiment.

Additionally, while FIG. 4 illustrates BLE communication circuit and controller 439, the disclosure is not limited to BLE communication and may utilize any other suitable short-range communication scheme, FIG. 5 illustrates an electronic device according to an embodiment.

Referring to FIG. 5, an electronic device 101 may include a sensing panel controller 511, a processor 512, a Bluetooth controller 513, and/or an antenna 514. The electronic device 101 may include a sensing panel 503, a display assembly 502 disposed on the sensing panel 503, and/or a window 501 disposed on the display assembly 502. When the sensing panel 503 is implemented as a digitizer, a touch screen panel may further be disposed thereover or thereunder to sense the user's touch. The touch screen panel may be positioned on the display assembly 502. The sensing panel 503 may be implemented as a digitizer and may include a plurality of loop coils. When implemented as a digitizer, the sensing panel 503 may include an element (e.g., an amplifier) for applying electrical signals (e.g., transmission signals) to the loop coils. The sensing panel 503 may include an element (e.g., an amplifier, capacitor, or analog-digital converter (ADC)) for processing signals (e.g., input signals) output from the loop coils. The sensing panel 503 may identify the position of the stylus pen 201 based on the magnitudes (e.g., digital values converted into per channel) of signals output from the loop coils and output the position to the processor 120. The processor 120 may identify the position of the stylus pen 201 based on the magnitudes (e.g., digital values converted into per channel) output from the loop coils. The sensing panel 503 may apply a current to at least one of the loop coils, and the at least one coil may create a magnetic field. The stylus pen 201 may be resonated by the magnetic field created around it, and a magnetic field may be created by the resonance from the stylus pen 201. By the magnetic field created from the stylus pen 201, a current may be output from each of the loop coils. The electronic device 101 may identify the position of the stylus pen 201 based on the per-channel current magnitudes (e.g., digital values converted into) of the loop coils.

To determine the position of the stylus pen 201, the loop coils may include coils extending in one axial (e.g., the x axis) direction and coils extending in another axial (e.g., the y axis) direction, but their array is not limited thereto.

The sensing panel controller 511 may apply transmission signals Tx to at least some of the plurality of loop coils of the sensing panel 503, and the loop coils receiving the transmit signals Tx may create a magnetic field. The sensing panel controller 511 may receive reception signals Rx from at least some of the plurality of loop coils in a time-division manner. The sensing panel controller 511 may identify the position of the stylus pen 201 based on the reception signal Rx and transfer the position of the stylus pen 201 to the processor 512. For example, the magnitude of the reception signal Rx may differ per loop coil (e.g., per channel), and the position of the stylus pen 201 may be identified based on the magnitudes of the received signals. The electronic device 101 may identify whether the button of the stylus pen 201 is pressed based on the frequency of the received signal. When the frequency of the reception signal is a first frequency, the electronic device 101 may identify that the button of the stylus pen 201 is pressed. However, when the frequency of the reception signal is a second frequency, the electronic device 110 may identify that the button of the stylus pen 201 is not pressed or is released. When the sensing panel is implemented as a touch screen panel (TSP), the sensing panel 503 may identify the position of the stylus pen 201 based on a signal output from an electrode. The touch screen panel may be positioned on the display assembly 502. The touch screen panel may be implemented in an in-cell structure in which sensor electrodes are positioned inside the display assembly 502 or in an on-cell structure where sensor electrodes are positioned on the display assembly 502. Alternatively, the electronic device 101 may detect the pen based on a variation in capacitance (mutual capacitance and/or self capacitance) at the touch panel electrode. A digitizer or hardware capable of sensing a pen signal from the stylus pen of the touch screen panel may be denoted as the sensing panel 503. When the position of the stylus pen 201 is identified using the touch screen panel, the electronic device 101 may identify whether the button is pressed based on the received communication signal.

The sensing panel controller 511 may identify whether the stylus pen 201 is inserted (or coupled) into the electronic device 101 based on the received signal and transfer the same to the processor 512. The sensing panel controller 511 may be integrated with the sensing panel 503. The pen controller 410 of FIG. 4, along with the sensing panel controller 510, may be implemented as a single integrated circuit (IC). The processor 512 may transmit a signal for wireless charging based on whether the stylus pen 201 is inserted. The processor 512 may control the Bluetooth controller 513 based on whether the stylus pen 201 is inserted and, when no wireless communication connection is formed, control the Bluetooth controller 513 to form a wireless communication connection to the stylus pen 201, Further, when the stylus pen 201 is mounted, the stylus pen 201 may transmit charging capacity information to the electronic device 101 via wireless communication. When the stylus pen 201 is removed, the stylus pen 201 may transmit information about a button pressing and sensor data to the electronic device 101, The processor 512 may perform control to transmit a charging signal and control signal to the sensing panel controller 511 based on the data received from the stylus pen 201. The processor 512 may identify the gesture of the stylus pen 201 based on the data received from the stylus pen 201 and perform an operation corresponding to the gesture. The processor 512 may transfer a function mapped to the gesture to an application. The Bluetooth controller 513 may transmit/receive information to/from the stylus pen 201 via the antenna 514. The display assembly 502 may include an element for displaying a screen. The window 501 may be formed of a transparent material to allow at least part of the display assembly 502 to be visually exposed.

Figure 6A:
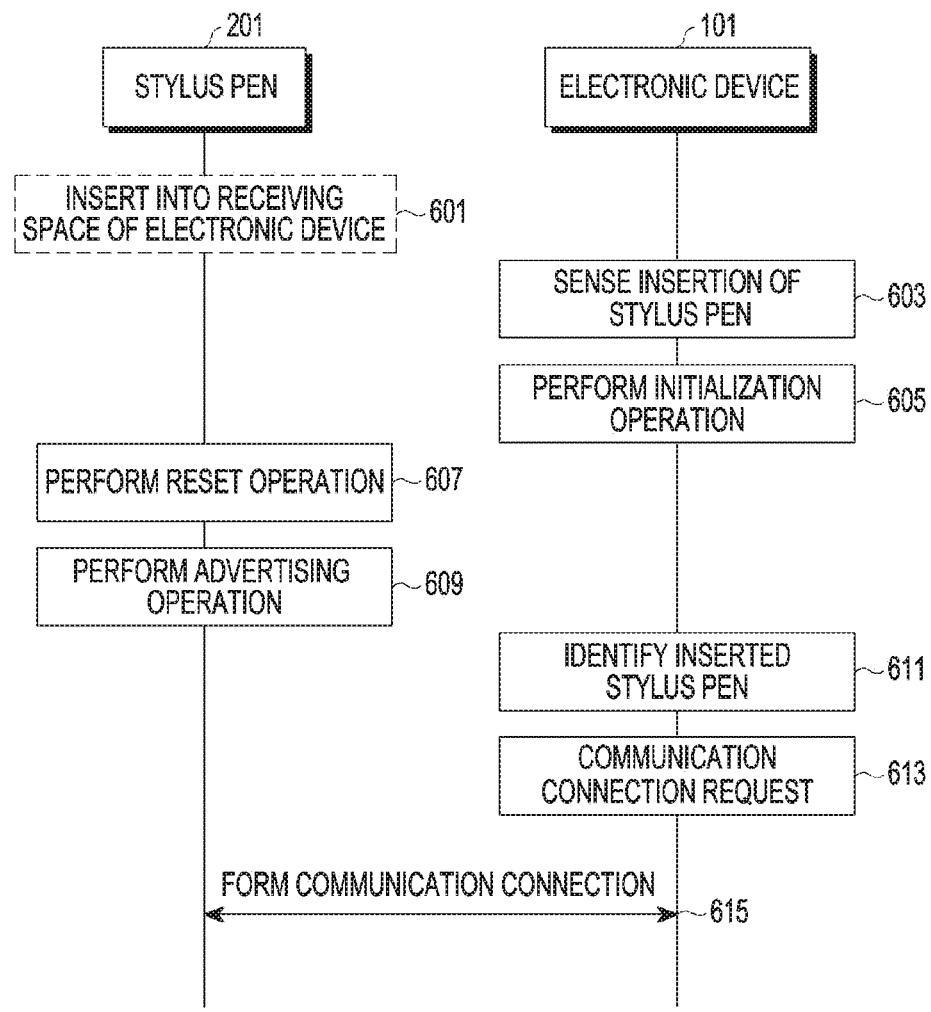
FIG. 6A illustrates operations of a stylus pen and an electronic device when the stylus pen is inserted into the electronic device, according to an embodiment.

FIG. 6A illustrates operations of a stylus pen and an electronic device when the stylus pen is inserted into the electronic device, according to an embodiment.

Referring to FIG. 6A, in operation 601, the stylus pen 201 is inserted into the receiving space of the electronic device 101. For example, the user may insert the stylus pen 201 into the receiving space of the electronic device 101, and this operation is shown in dashed lines based on not being an active operation of the stylus pen 201.

FIG. 6A illustrates an example in which the stylus pen 201 is inserted into the electronic device 101 when there is no communication connection formed between the stylus pen 201 and the electronic device 101. As described herein, when the electronic device 101 or stylus pen 201 performs a specific operation, this may mean that the processor 120 included in the electronic device 101 or the processor 220 included in the stylus pen 201 performs the specific operation. When the electronic device 101 or stylus pen 201 performs a specific operation, this may mean that the processor 120 included in the electronic device 101 or the processor 220 included in the stylus pen 201 controls other hardware to perform the specific operation. When the electronic device 101 or stylus pen 201 performs a specific operation, this may mean that instructions stored in the memory are executed or stored to enable the processor 120 included in the electronic device 101 or the processor 220 included in the stylus pen 201 to perform the specific operation.

In operation 603, the electronic device 101 may detect the insertion of the stylus pen 201. For example, the electronic device 101 may detect an insertion of the stylus pen 201 based on a reception signal received from the stylus pen 201 in response to a transmission signal transmitted through receiving space coils. Detection of insertion is not limited to a specific scheme.

In operation 605, the electronic device 101 may perform an initialization operation. For example, the electronic device 101 may transfer a reset command to the stylus pen 201. The electronic device 101 may transfer the reset command upon identifying an insertion of the stylus pen 201 with no connection history, a stuck state, idle state, or a state in which no connection has been formed.

In operation 607, the stylus pen 201 may perform a reset operation. For example, the stylus pen 201 may release the existing BLE connection and initialize the BLE communication module. In operation 609, the stylus pen 201 may perform an advertising operation. For example, the stylus pen 201 may broadcast advertisement signals. In operation 611, the electronic device 101 may identify the inserted stylus pen 201. The electronic device 101 may identify the inserted stylus pen 201 based on the received advertisement signal.

In operation 613, the electronic device 101, may send a request for communication connection. For example, the electronic device 101 may transmit a connection request signal corresponding to the advertisement signal. In operation 615, the stylus pen 201 may form a communication connection with the electronic device 101.

Figure 6B:
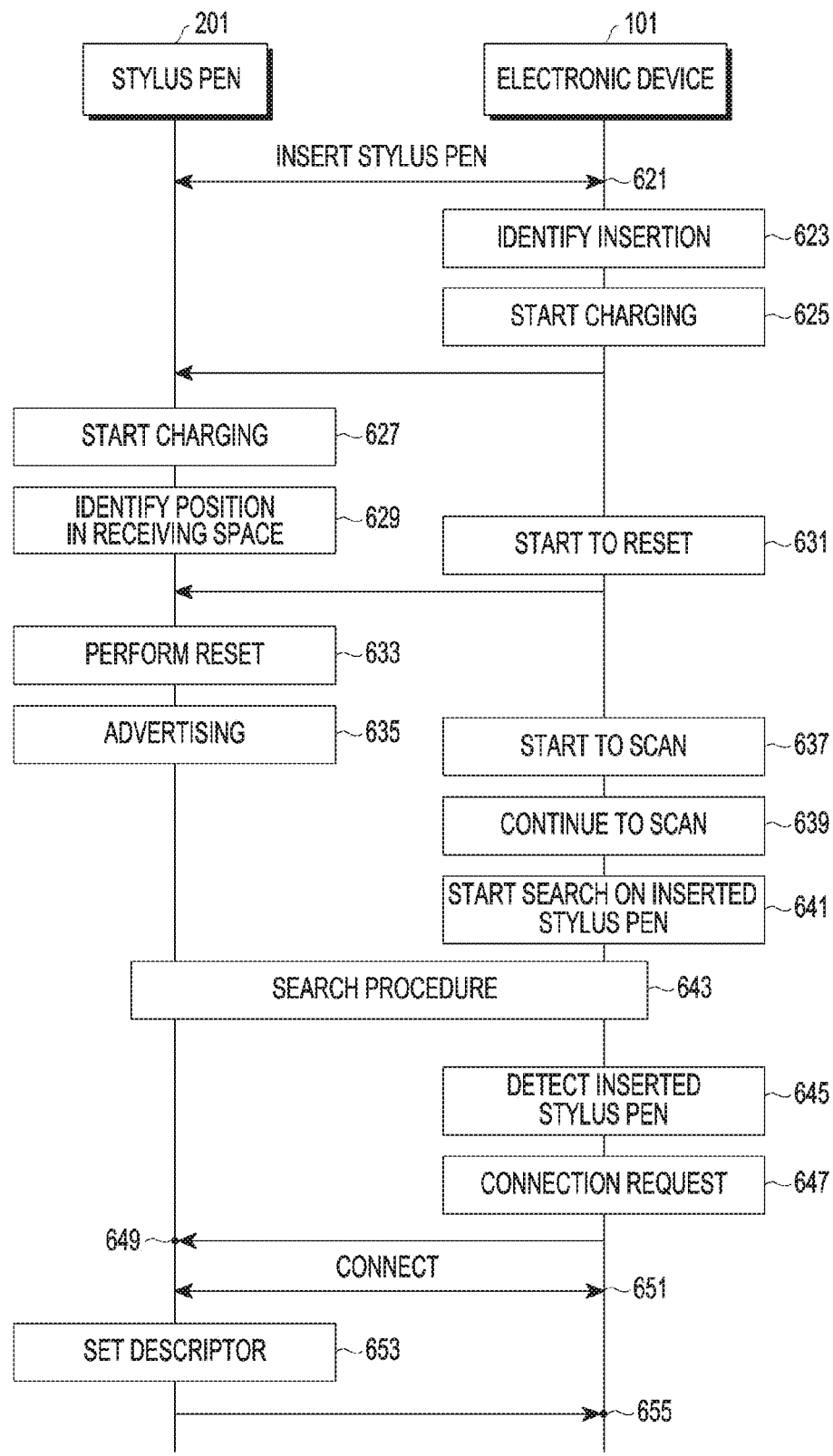
FIG. 6B illustrates operations when a stylus pen is inserted into an electronic device according to an embodiment.

FIG. 6B illustrates operations when a stylus pen is inserted into an electronic device according to an embodiment.

Referring to FIG. 6B, in operation 621, the stylus pen 201 may be inserted into a receiving space of the electronic device 101.

Upon identifying the insertion in step 623, the electronic device 101 may start charging in operation 625, For example, the electronic device 101 may transfer a signal with a pattern indicating the charge start through the coils 411 and 412 of the receiving space or may transfer a communication signal indicating the charge start through the communication module to the stylus pen 201.

In operation 627, the stylus pen 201 may identify the information indicating the charge start and may start charging (chg_on). For example, the stylus pen 201 may control a charging switch 436 to connect the rectifier 435 to the battery 437.

In operation 629, the stylus pen 201 may detect being positioned in the receiving space. In operation 631, the electronic device 101 transfers a command of reset start to the stylus pen 201.

In operation 633, the stylus pen 201 may perform a reset. For example, the stylus pen 201 may initialize the BLE module.

In operation 635, the stylus pen 201 may perform an advertising procedure.

In operation 637, the electronic device 101 may start scanning for the stylus pen and, in operation 639, continue scanning. For example, the electronic device 101 may perform scanning during a time-out period (e.g., 40 seconds).

In operation 641, the electronic device 101 may start searching for the inserted stylus pen. Alternatively, operation 637, operation 639, and operation 641 may be performed as one operation.

In operation 643, the electronic device 101 and the stylus pen 201 may perform a search procedure. For example, after transmitting a charge start signal or without transmitting a charge start signal, the electronic device 101 may perform a search of whether there is a stylus pen 201 transmitting an advertising signal. The stylus pen 201 may be configured to transmit an advertising signal upon receiving the charge start signal. Thus, the electronic device 101 may identify the advertising signal received after transmitting the charge start signal and may thus identify the stylus pen 201 inserted into the electronic device 101.

In operation 645, the electronic device 101 detects the inserted stylus pen 201.

In operation 647, the electronic device 101 may transfer a connect request to the stylus pen 201. In operation 649, the stylus pen 201 may receive the connect request from the electronic device 101. In operation 651, the electronic device 101 and the stylus pen 201 may be connected together.

In operation 653, the stylus pen 201 may set a descriptor and transfer information about the descriptor to the electronic device 101. The electronic device 101 may identify the descriptor. The descriptor may be a setting for an activated function (e.g., device information including battery information or button event) and is not limited in type.

In operation 655, the stylus pen 201 may transmit information about the descriptor to the electronic device 101. Alternatively, the electronic device 101 may identify that there is no need for performing a reset/communication connection with the stylus pen 201, in which case, operations 631 to 651 may be omitted, FIG. 6C illustrates operations of an electronic device and a stylus pen when the stylus pen is inserted, according to an embodiment.

Figure 6C:
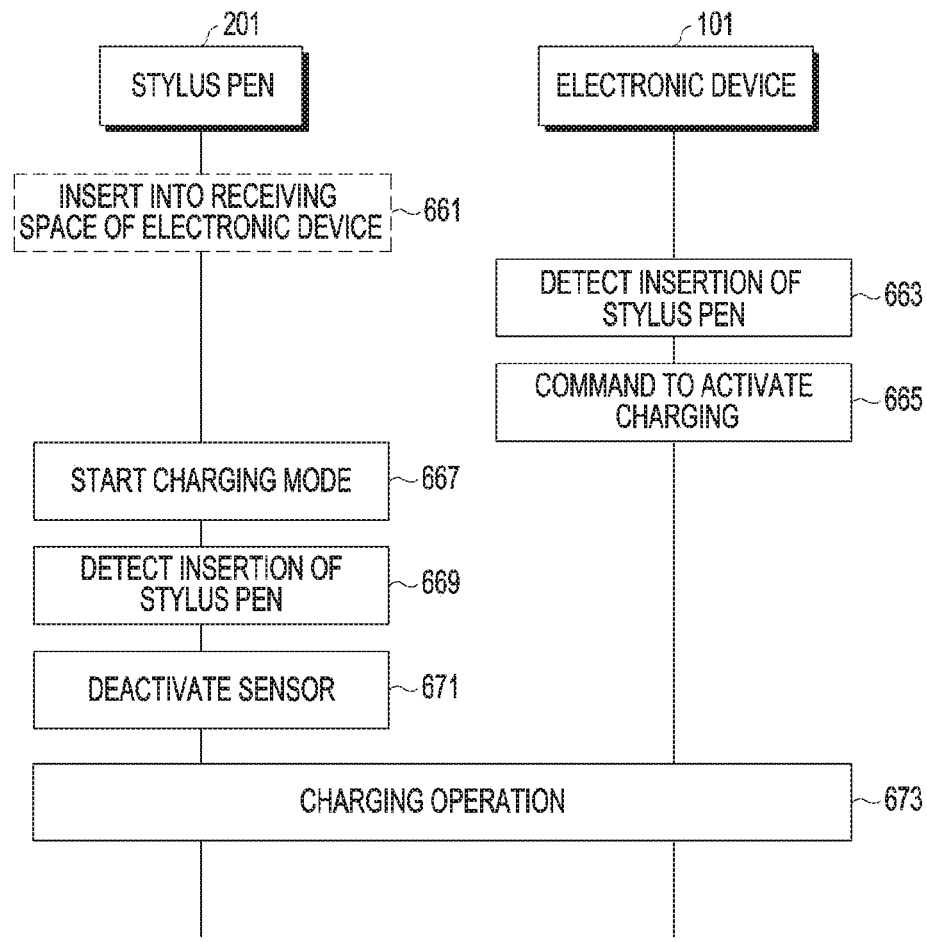
FIG. 6C illustrates operations of an electronic device and a stylus pen when the stylus pen is inserted, according to an embodiment.

Referring to FIG. 6C, in operation 661, the stylus pen 201 may be inserted into the receiving space of the electronic device 101. For example, after its initial insertion, the stylus pen 201 may be removed from, or inserted back into, the receiving space. In operation 663, the electronic device 101 may detect the insertion of the stylus pen 201. In operation 665, the electronic device 101 may command the stylus pen 201 to activate charging. The electronic device 101 may command to activate charging based on transmission of a signal with a pattern via a receiving space coil or a communication signal via the communication module.

In operation 667, the electronic device 101 may start a charging mode. In operation 669, the stylus pen 201 may detect an insertion of the stylus pen 201, The stylus pen 201 may identify whether it is inserted based on information received from the electronic device 101 or the magnitude of voltage applied to the resonance circuit (or output terminal of the rectifier) of the stylus pen 201. In operation 671, the stylus pen 201 may deactivate the sensors. The stylus pen 201 may deactivate some sensors or be configured to skip sensor deactivation. In operation 673, the electronic device 101 and the stylus pen 201 may perform charging. Alternatively, charging 673 may be performed immediately after the charging mode is initiated in operation 667, as the time of performing charging is not limited to a specific time.

Figure 7:
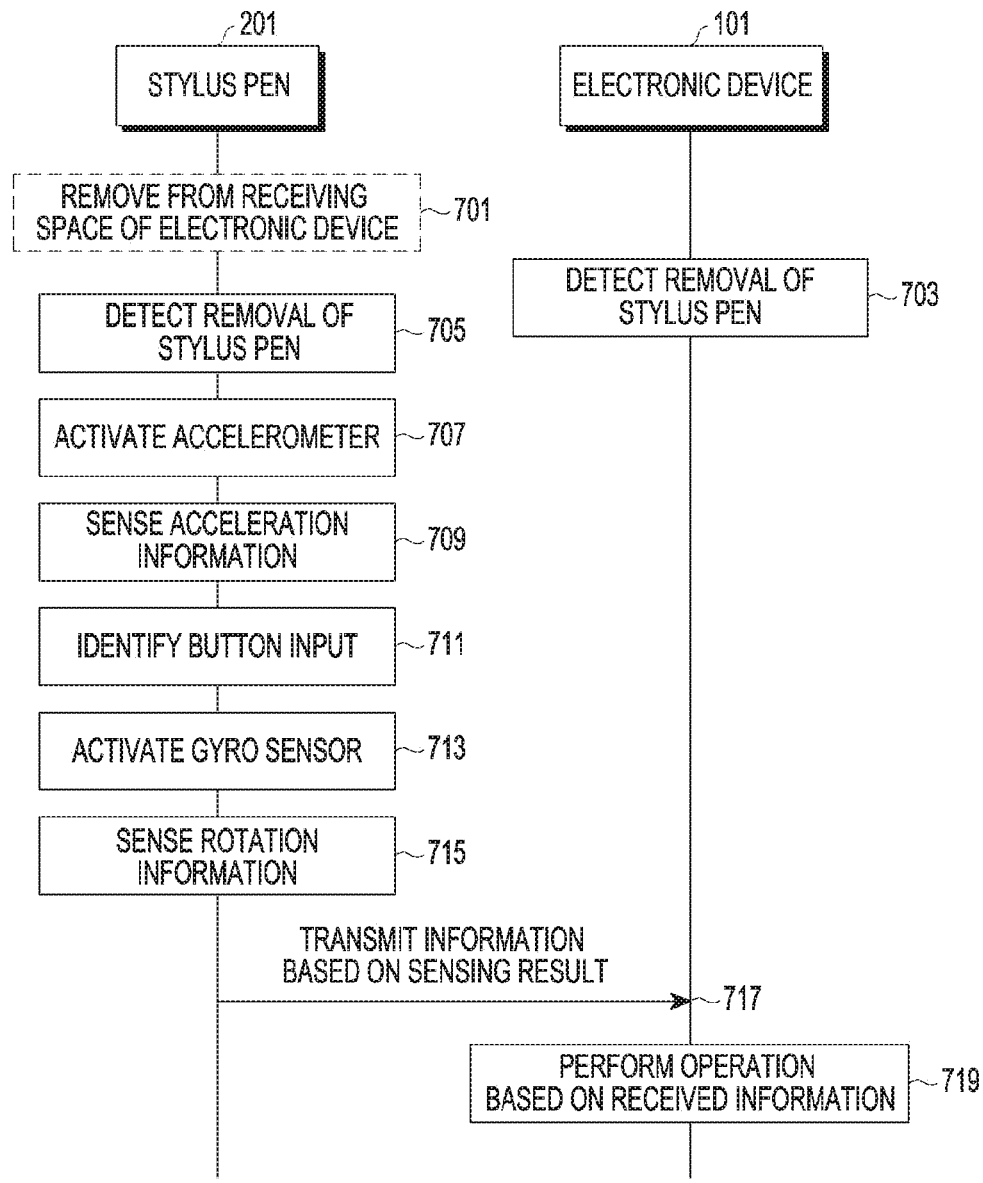
FIG. 7 illustrates operations of a stylus pen and an electronic device when the stylus pen is removed from the electronic device, according to an embodiment.

FIG. 7 illustrates operations of a stylus pen and an electronic device when the stylus pen is removed from the electronic device, according to an embodiment.

Referring to FIG. 7, in operation 701, the stylus pen 201 may be removed from the receiving space of the electronic device 101. For example, the user may pull the stylus pen 201 out of the receiving space of the electronic device 101.

In operation 703, the electronic device 101 may detect the removal of the stylus pen 201. For example, the electronic device 101 may detect the removal of the stylus pen 201 based on failure to receive a signal responsive to the signal from the receiving space coils 411 and 412, but not limited to a specific method for detecting the removal. The electronic device 101 may be configured to identify insertion/removal of the stylus pen 201 based on sensing data from a detection sensor, e.g., a hall sensor.

In operation 705, the stylus pen 201 may detect the removal of the stylus pen 201. For example, the stylus pen 201 may detect the removal of the stylus pen 101 based on failure to receive a signal from the electronic device 101 based on the voltage VM of the output end of the rectifier 431, but not limited to a specific method for detecting the removal. Upon detecting the removal, the stylus pen 201 may exchange parameters (e.g., connection interval and/or slave latency) with the electronic device 101.

In operation 707, the stylus pen 201 may activate the accelerometer based on detection of the removal, and in step 709, the stylus pen 201 may sense acceleration information about the stylus pen 201 via the activated accelerometer.

The stylus pen 201 may transmit the sensed acceleration information to the electronic device 101. The electronic device 101 may perform an operation based on the received acceleration information. The stylus pen 201 may be configured to activate the accelerometer while keeping the gyro sensor, which consumes relatively high power, inactive.

In operation 711, the stylus pen 201 may identify an input of the button. Upon identifying a button input, the stylus pen 201 may activate the gyro sensor in operation 713.

In operation 715, the stylus pen 201 may sense rotation information via the activated gyro sensor in operation 715, and in operation 717, the stylus pen 201 may transmit information based on the result of sensing. For example, the stylus pen 201 may transmit sensing information obtained via the accelerometer and/or gyro sensor to the electronic device 101. The stylus pen 201 may identify the coordinates of the stylus pen 201 (e.g., two-dimensional coordinates or three-dimensional coordinates) based on the sensing information obtained via the accelerometer and gyro sensor and transmit the identified coordinates to the electronic device 101. The stylus pen 201 may identify displacement information about the coordinates of the stylus pen 201 based on the sensing information obtained via the accelerometer and gyro sensor. The stylus pen 201 may transmit the identified displacement information to the electronic device 101. The stylus pen 201 may estimate an initial orientation of the stylus pen 201 based on information measured by the accelerometer. The stylus pen 201 may correct the position information using the initial Orientation.

In operation 719, the electronic device 101 may perform an operation based on the received information. Upon receiving the sensing information, the electronic device 101 may identify the position information about the stylus pen 201 based on the sensing information and identify a gesture corresponding to the position information. The electronic device 101 may perform an operation corresponding to the identified gesture. Upon receiving the position information about the stylus pen 201, the electronic device 101 may identify the gesture corresponding to the position information and perform an operation corresponding to the gesture. For example, the stylus pen 201 may transmit information to the electronic device 101 until the pen button input is released. The electronic device 101 may identify the gesture based on the position information about the stylus pen 201 identified until the release of the button input is detected. Upon detecting the release of the button input, the stylus pen 201 may again deactivate the gyro sensor.

The stylus pen 201 may activate both the gyro sensor and the accelerometer at the time of detecting removal. In this case, the position information about the stylus pen 201 before the button input may be used to correct the direction of gesture, allowing for better accuracy for gesture recognition. For example, the electronic device 101 may identify initial orientation information about the stylus pen 201 and recognize the gesture using a displacement based on the initial orientation information, FIG. 8 illustrates operations when a stylus pen is inserted into/removed from an electronic device according to an embodiment.

Figure 8:
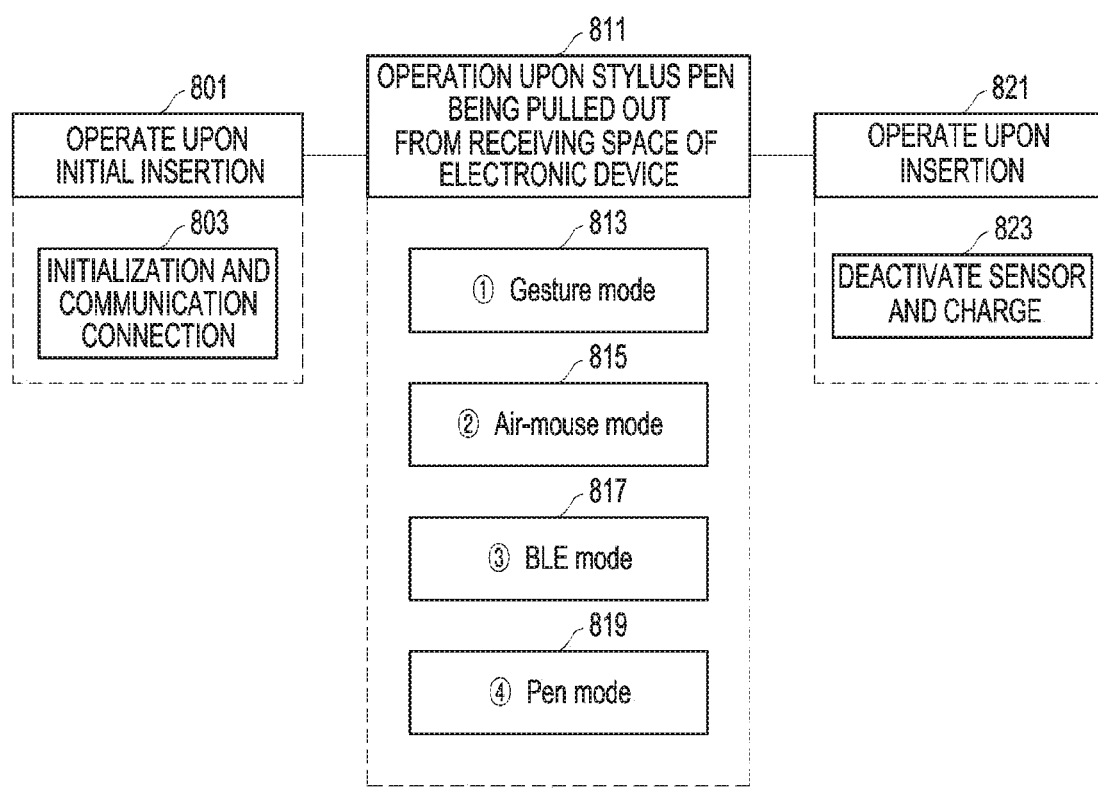
FIG. 8 illustrates operations when a stylus pen is inserted into/removed from an electronic device according to an embodiment.

Referring to FIG. 8, when the stylus pen 201 is first received in the electronic device 101 in operation 801), the stylus pen 201 and the electronic device 101 may perform initialization and communication connection of the communication module in operation 803.

When the stylus pen 201 is pulled out from the receiving space of the electronic device 101 in operation 811, the electronic device 101 and the stylus pen 201 may be operated in any one mode of a gesture mode 813, an air mouse mode 815, a BLE mode 817, or a pen mode 819. The gesture mode 813, the air mouse mode 815, the BLE mode 817, or the pen mode 819 is a scheme for processing at least one of a communication signal from the stylus pen 201 or the position of the stylus pen 201 and may be referred to as a processing scheme. For example, when the stylus pen 201 is positioned inside a recognition area (in-range) of the sensing panel (e.g., a digitizer and/or touch screen panel), the electronic device 101 and the stylus pen 201 may be operated in the pen mode 819. For example, when the stylus pen 201 is positioned outside the recognition area (out-range) of the sensing panel, the electronic device 101 and the stylus pen 201 may be operated in any one mode of the gesture mode 813, the air mouse mode 815, or the BLE mode. Entry conditions and operations for each mode are described below.

When the stylus pen 201 is removed from the electronic device 101 and is then reinserted in step 821, the stylus pen 201 may deactivate the sensor and perform charging in step 823. The stylus pen 201 may also perform sensor deactivation and charging upon first insertion.

Figure 9:
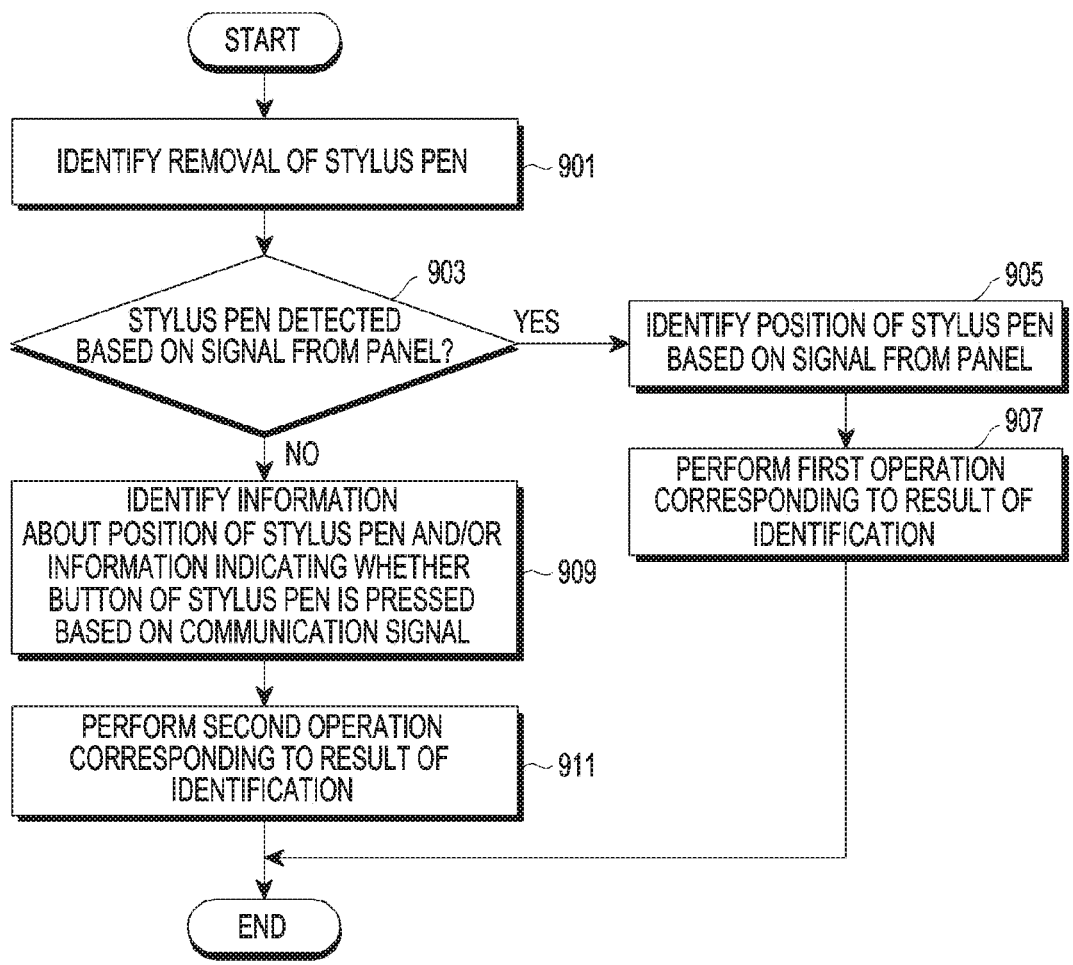
FIG. 9 is a flowchart illustrating a method for operating an electronic device according to an embodiment.
Figure 10:
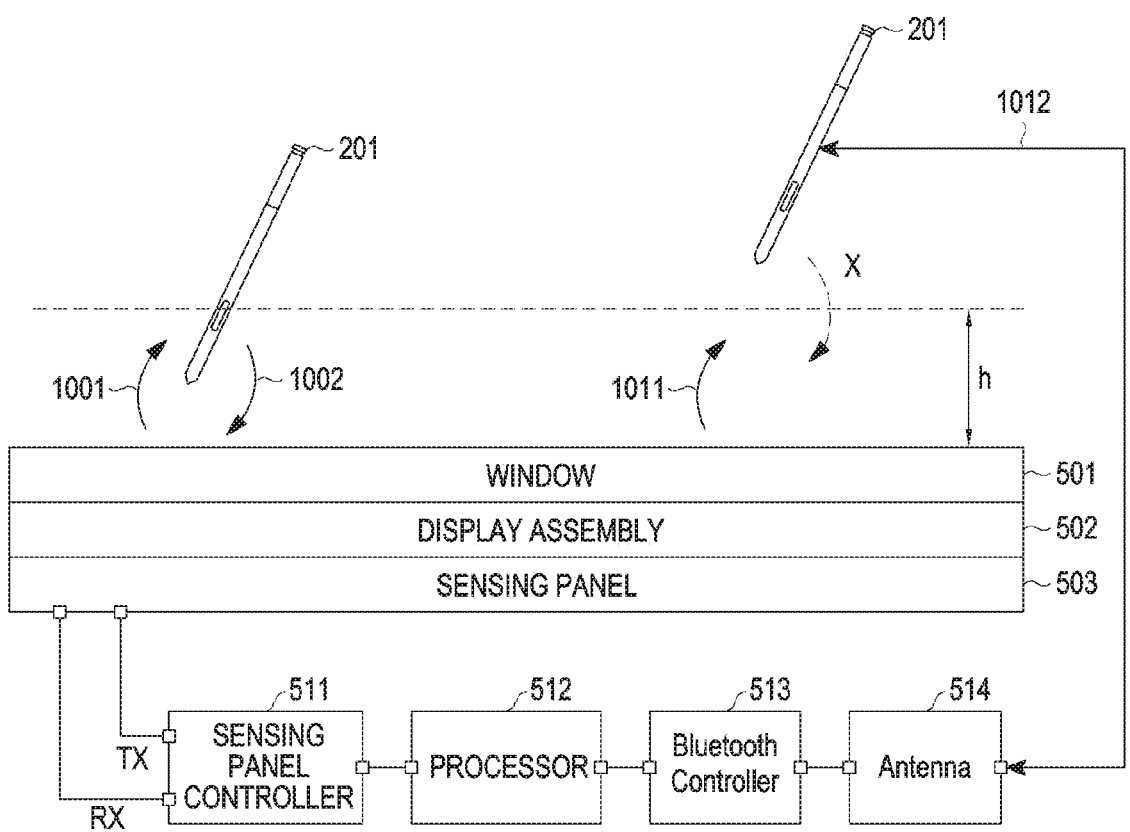
FIG. 10 illustrates positional relationships between a stylus pen and an electronic device according to an embodiment.

FIG. 9 is a flowchart illustrating a method for operating an electronic device according to an embodiment, FIG. 10 illustrates positional relationships between a stylus pen and an electronic device according to an embodiment.

Referring to FIGS. 9 and 10, the electronic device 101 identifies removal of the stylus pen 201 in step 901.

In operation 903, the electronic device 101 may identify whether the stylus pen 201 is detected based on a signal from the panel. For example, when the electronic device 101 uses an EMR scheme, the electronic device 101 may identify whether the stylus pen 201 is detected based on a reception signal output from the sensing panel 503.

Referring to FIG. 10, the stylus pen 201 may be positioned within a recognition range h from the panel of the electronic device 101. The sensing panel 503 may output a transmission signal 1001 (e.g., a magnetic field) during a first period. By the transmission signal 1001, a resonance may occur within the resonance circuit inside the stylus pen 201, and a reception signal 1002 may be generated by the resonance. The sensing panel 503 may identify the position of the stylus pen 201 based on the reception signal 1002 during a second period. When the magnitude of the reception signal 1002 exceeds a threshold magnitude, the electronic device 101 may identify that the stylus pen 201 has been detected. When the stylus pen 201 is positioned outside the recognition range h from the panel of the electronic device 101, no reception signal is generated from the stylus pen 201 or a reception signal from the stylus pen 201 may have a magnitude less than the threshold magnitude. In this case, the electronic device 101 may identify that it has failed to detect the stylus pen 201. Alternatively, when a variation in capacitance at a touch panel is less than a threshold variation, the electronic device 101 using the touch panel may identify that it has failed to detect the stylus pen 201. The stylus pen 201 may identify whether the stylus pen 201 is positioned within the recognition range, based on the magnitude of the transmission signal 1001. As described above, the electronic device 101 may perform communication with the stylus pen 201, based on a first communication scheme (e.g., a communication scheme using EMR). Upon using the first communication scheme, the electronic device 101 may use the sensing panel 503, such as a digitizer, and the stylus pen 201 may use a resonance coil. The electronic device 101 may also perform communication with the stylus pen 201 based on a second communication scheme (e.g., a communication scheme using BLE).

Referring again to FIG. 9, upon identifying that the stylus pen 201 has been detected in step 903, the electronic device 101 may identify the position of the stylus pen 201 based on a signal from the panel in operation 905.

In operation 907, the electronic device 101 may perform a first operation corresponding to the position of the stylus pen 201 based on the result of identification. For example, the electronic device 101 may perform a function configured to an object corresponding to the position of the stylus pen 201 or display a drawing object depending on the position of the stylus pen 201. Additionally, the electronic device 101 may identify whether the button of the stylus pen 201 is pressed. The electronic device 101 may perform operations further based on whether the button of the stylus pen 201 is pressed. The electronic device 101 may identify whether the button of the stylus pen 201 is pressed based on information received through the communication module or the frequency of a signal identified on the panel.

Referring again to FIG. 10, upon identifying a gesture based on information included in a communication signal within the recognition range h, the electronic device 101 may perform different operations from when identifying a gesture based on information included in a communication signal outside the recognition range h. For example, upon identifying a swipe up gesture by a communication signal from the stylus pen 201 within the recognition range h, the electronic device 101 may perform an up-scroll. Upon identifying a swipe up gesture by a communication signal from the stylus pen 201 outside the recognition range h, the electronic device 101 may perform an enlarge operation. However, this is merely an example. The electronic device 101 may be configured to disregard the gesture by the communication signal from the stylus pen 201 within the recognition range h.

Referring again to FIG. 9, upon identifying that the stylus pen 201 has not been detected in step 903, the electronic device 101 may identify information about the position of the stylus pen 201 and/or information indicating whether the button of the stylus pen 201 is pressed, based on the communication signal in operation 909.

Referring again to FIG. 10, when the stylus pen 201 is outside the recognition range h, the stylus pen 201 may not receive the transmission signal 1011 from the panel and, thus, no reception signal may be generated by resonance, Thus, the stylus pen 201 may transmit/receive the communication signal 1012 to/from the electronic device 101. The electronic device 101 may identify whether the button of the stylus pen 201 is pressed and/or the information about the position of the stylus pen 201, based on the information included in the communication signal.

Referring again to FIG. 9, in operation 911, the electronic device 101 may perform a second operation corresponding to the result of identification. The electronic device 101 may identify a processing mode based on information included in at least one communication signal and may be operated according to the identified processing mode.

Referring again to FIG. 10, when the stylus pen 201 is positioned within the recognition range h, the stylus pen 201 may detect a transmission signal 1001 from the sensing panel 503 of the electronic device 101. When the transmission signal 1001 is detected, although a pressing of the button is identified, the stylus pen 201 may not transfer information indicating the identified button pressing to the Bluetooth controller 513. Thus, even when the button is pressed, the stylus pen 201 may not transmit the communication signal indicating whether the button is pressed to the electronic device 101.

When the stylus pen 201 is positioned outside the recognition range h, the stylus pen 201 may transmit/receive the communication signal 1012 to/from the electronic device 101. Meanwhile, the stylus pen 201 may enter the recognition range h while transmitting/receiving the communication signal 1012. In this case, the stylus pen 201 may detect a transmission signal 1001 from the sensing panel 503 of the electronic device 101. When the transmission of the communication signal 1012 has started, although the transmission signal 1001 from the sensing panel 503 is detected, the stylus pen 201 may keep on transmitting the communication signal 1012.

Figure 11:
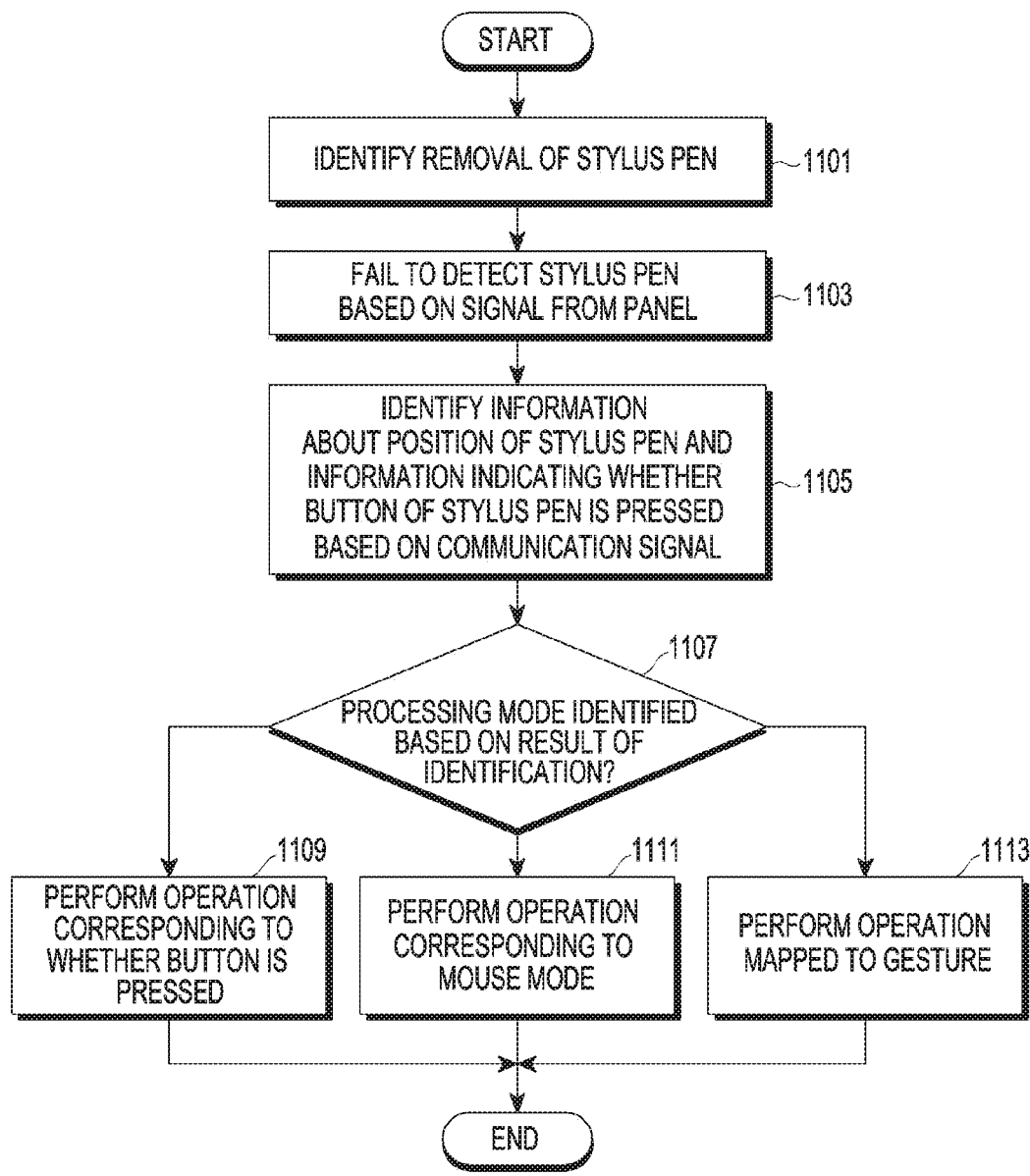
FIG. 11 illustrates a method for operating an electronic device according to an embodiment.

FIG. 11 is a flowchart illustrating a method for operating an electronic device according to an embodiment.

Referring to FIG. 11, the electronic device 101 may identify removal of the stylus pen 201 in operation 1101. In operation 1103, the electronic device 101 may identify a failure to detect the stylus pen 201 based on a signal from the panel. The stylus pen 201 may be positioned outside the recognition range from the panel of the electronic device 101.

In operation 1105, the electronic device 101 may identify information about the position of the stylus pen 201 and information indicating whether the button of the stylus pen 201 is pressed, based on a communication signal.

In operation 1107, the electronic device 101 may identify a processing mode based on the result of identification.

For example, upon identifying a manipulation (pressing-release) of the button 337 of the stylus pen 201 while detecting no movement of the stylus pen 201 based on information included in a communication signal in step 1107, the electronic device 101 may set the processing mode to the BLE mode. That is, the electronic device 101 may perform an operation corresponding to whether the button is pressed in operation 1109.

Upon identifying a long press of the button 337 of the stylus pen 201 based on information included in a communication signal in step 1107, the processing mode may be set to the air mouse mode. That is, the electronic device 101 may perform an operation corresponding to the mouse mode in operation 1111.

Upon detecting a movement of the stylus pen 201 in step 1107, with the button 337 of the stylus pen 201 pressed, based on the information included in the communication signal, the electronic device 101 may set the processing mode to the gesture mode. That is, the electronic device 101 may perform an operation mapped to the gesture in operation 1113.

The above-described processing mode setting condition is merely an example and the disclosure is not limited to a particular one.

Figure 12:
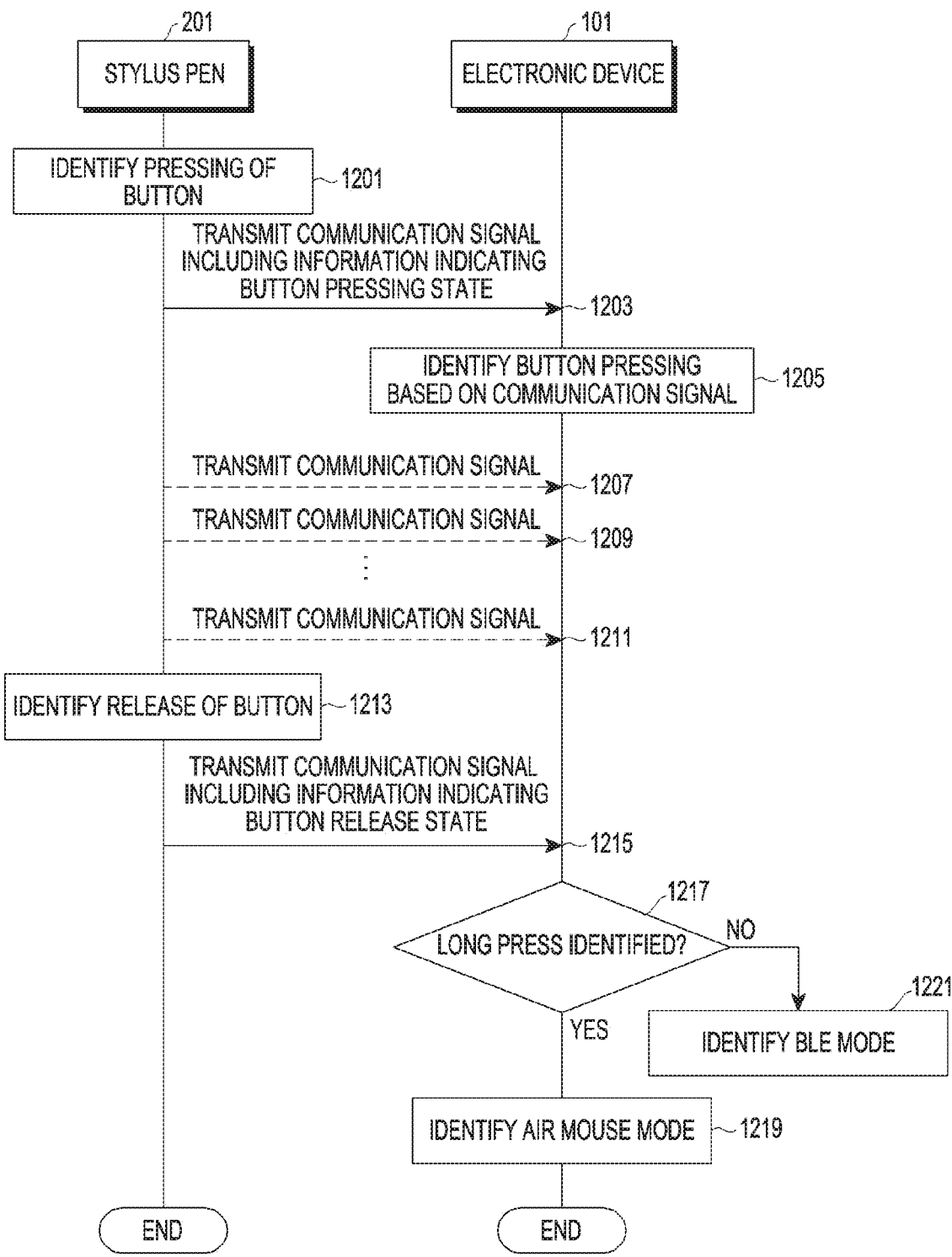
FIG. 12 illustrates a method of operating an electronic device and a stylus pen according to an embodiment.

FIG. 12 illustrates a method of operating an electronic device and a stylus pen according to an embodiment.

Referring to FIG. 12, the stylus pen 201 may identify a pressing of the button in operation 1201. In operation 1203, the stylus pen 201 may transmit a communication signal including information indicating the button pressing state to the electronic device 101.

The electronic device 101 may identify a pressing of the button based on a communication signal in operation 1205.

In operation 1207, operation 1209, and operation 1211, the stylus pen 201 may transmit a communication signal to the electronic device 101. Before the button is released, the stylus pen 201 may transmit a communication signal including the information indicating that the button is in the state of being pressed. The stylus pen 201 may also transmit a communication signal that does not include the information about the button.

Alternatively, the stylus pen 201 may be configured to transmit no communication signal before a specific event occurs. In this case, operation 1207, operation 1209, and operation 1211 may be omitted.

The stylus pen 201 may identify a release of the button in operation 1213. In operation 1215, the stylus pen 201 may transmit a communication signal including information indicating the button released state to the electronic device 101.

The electronic device 101 may identify whether a long press is identified in operation 1217. For example, the electronic device 101 may identify whether a long press is identified based on whether the time between the time of button pressing and the time of button release exceeds a threshold time (e.g., three seconds). Further, upon identifying a stopped state of the stylus pen 201 with the button pressed or upon identifying no gesture corresponding to the movement of the stylus pen 201, the electronic device 101 may identify a long press. The electronic device 101 may identify the stopped state or gesture, based on information about the position of the stylus pen 201 included in the communication signal received in operation 1207, operation 1209, and operation 1211.

When a long press is identified in step 1217, the electronic device 101 may identify the air mouse mode in operation 1219. However, when a long press is not identified in step 1217, the electronic device 101 may identify the BLE mode in operation 1221. The stylus pen 201 may identify that the button maintains the pressed state for a predetermined time and is then released and, based thereupon, identify an occurrence of a long press. Upon identifying an occurrence of a long press, the stylus pen 201 may transmit a communication signal including information indicating the long press to the electronic device 101. The electronic device 101 may identify that the information included in the communication signal is a long press and enter into the air mouse mode. However, identifying the long press is not limited to a specific scheme.

Further, detection of a long press is an example condition for entry into the air mouse condition, and conditions for entry into the air mouse mode are not limited thereto. The stylus pen 201 may transmit button pressing information including a long press, short press, or double press, to the electronic device 101, and the button pressing information is not limited thereto.

Figure 13:
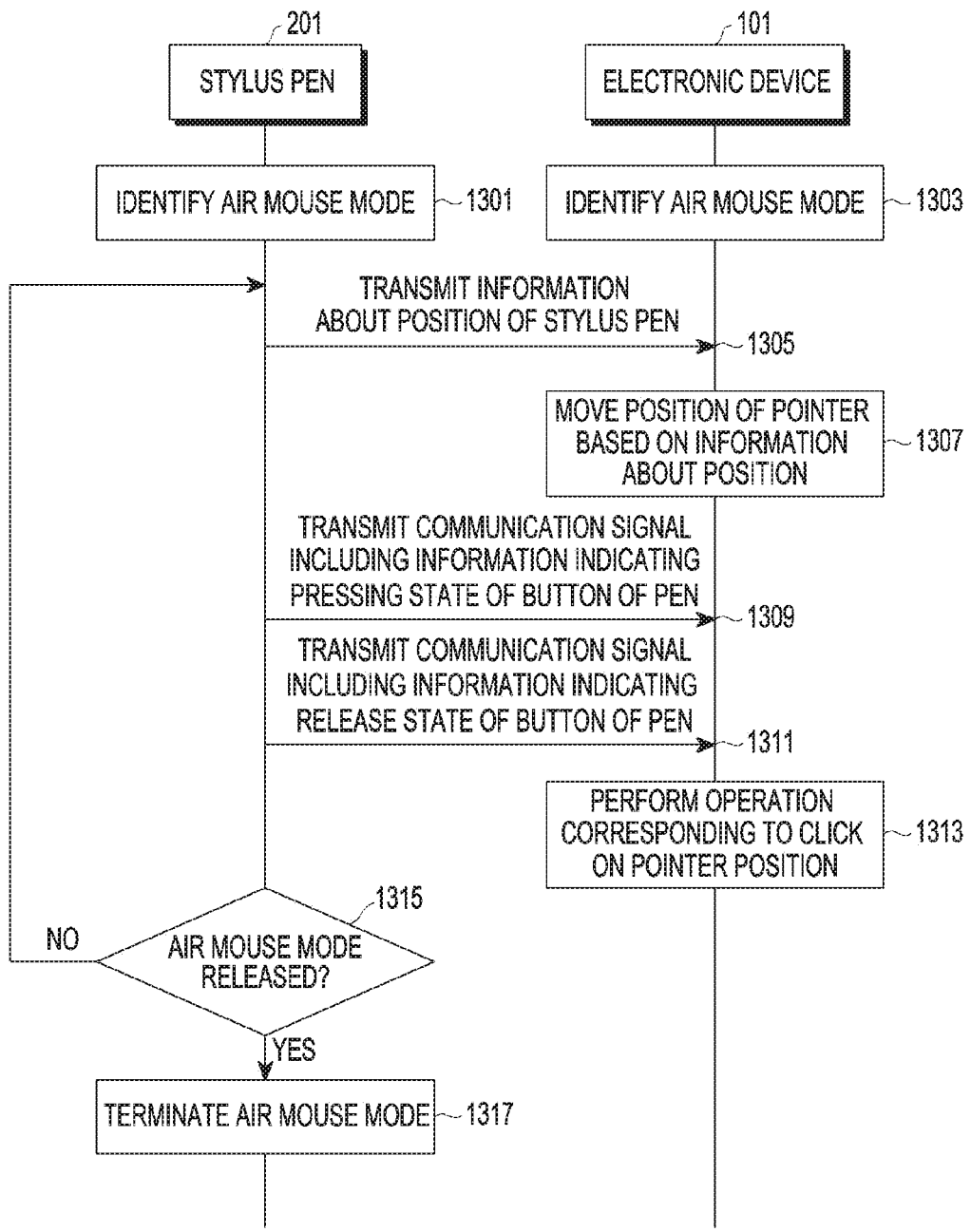
FIG. 13 illustrates a method of operating a stylus pen and an electronic device according to an embodiment.

FIG. 13 illustrates a method of operating a stylus pen and an electronic device according to an embodiment.

Referring to FIG. 13, the stylus pen 201 may identify the air mouse mode in operation 1301, and the electronic device 101 may identify the air mouse mode in operation 1303, As described above, the electronic device 101 may identify the air mouse mode based on detection of a long press. The stylus pen 201 may identify the air mouse mode based on detection of a long press or may identify the air mouse mode by receiving information about the processing mode from the electronic device 101.

In operation 1305, the stylus pen 201 may transmit information about the position of the stylus pen 201.

In operation 1307, the electronic device 101 may move the position of the pointer based on the information about the position. The electronic device 101 may steadily receive the information about the position of the stylus pen 201 and, thus, continuously move the position of the pointer being displayed.

In operation 1309, the stylus pen 201 may transmit a communication signal including information indicating the pressing state of the button to the electronic device 101. In operation 1311, the stylus pen 201 may transmit a communication signal including information indicating the button released state of the pen to the electronic device 101, In operation 1313, the electronic device 101 may identify a pressing and release of the button and perform an operation corresponding to a click on the position of the pointer. The user may move the stylus pen 201, with the button of the stylus pen 201 pressed. After receiving the information indicating the pressing state of the button, the electronic device 101 may perform a drag operation based on the information about the position of the stylus pen 201.

In operation 1315, the stylus pen 201 may identify whether the air mouse mode is released. For example, the electronic device 101 may terminate the air mouse mode based on a user input (e.g., a click on a release icon) through a user interface (UI) and notify the stylus pen 201 of this.

Upon identifying that the air mouse mode is released in step 1315, the stylus pen 201 may terminate the air mouse mode in operation 1317. The electronic device 101 may identify the termination of the air mouse. For example, the electronic device 101 may terminate the air mouse mode by receiving information indicating the termination of the air mouse from the stylus pen 201 or identifying an air mouse termination event set for the electronic device 101.

Figure 14A:
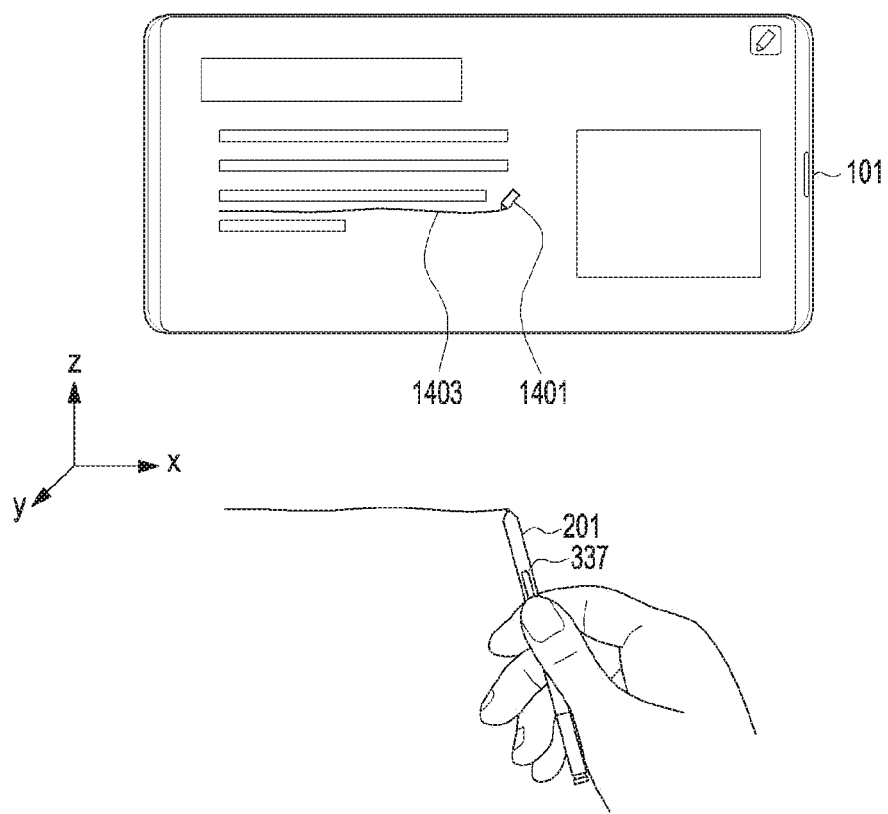
FIGS. 14A and 14B illustrate operations of an electronic device in a mouse mode according to various embodiments.
Figure 14B:
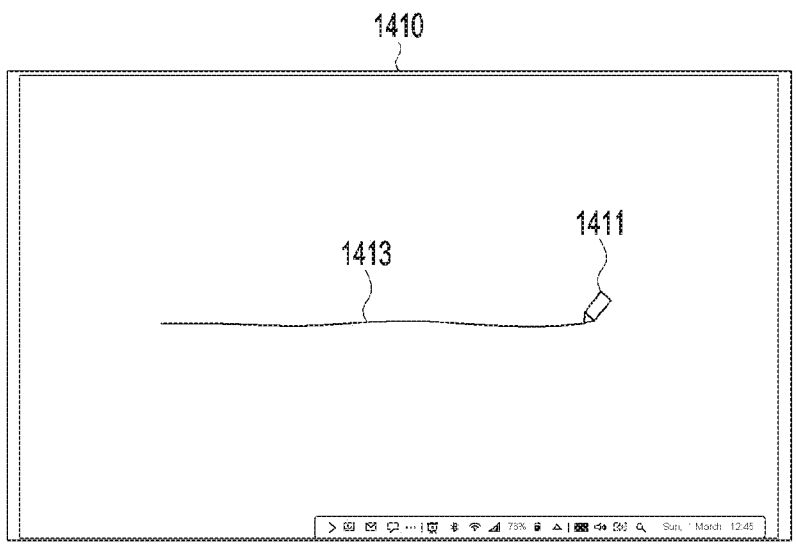
Figure 14B:
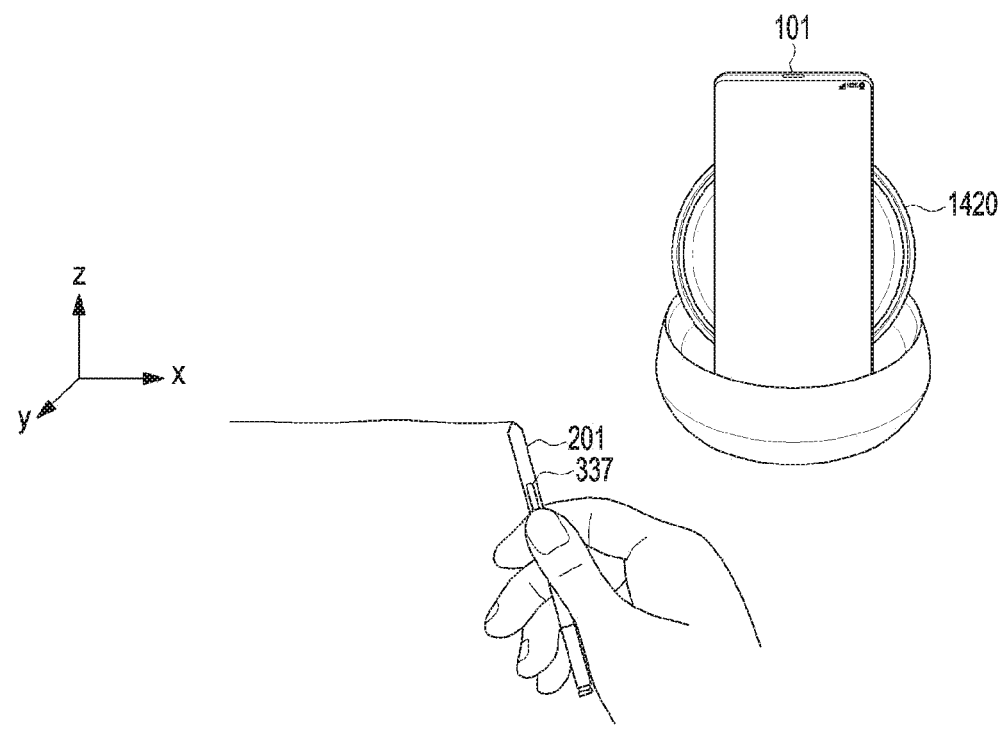

FIGS. 14A and 14B illustrates operations of an electronic device in a mouse mode according to various embodiments.

Referring to FIG. 14A, in the air mouse mode, the user may move from left to right, with the button 337 of the stylus pen 201 pressed. In the air mouse mode, the electronic device 101 may receive a communication signal including information indicating a pressing of the button 337. Thereafter, the electronic device 101 may receive a plurality of communication signals including the information about the position of the stylus pen 201. The electronic device 101 may move the pointer 1401 based on the received information about position. The electronic device 101 may display a drawing object 1403 corresponding to a drag gesture based on the movement of the pointer with the button pressed. The electronic device 101 may display an object (e.g., kind of gesture or gesture input trajectory) corresponding to the drag gesture also in the gesture mode and, thus, the user may identify the kind of the gesture, which the user inputs, by identifying the displayed object.

When the user moves the stylus pen 201 with the button 337 of the stylus pen 201 not being pressed, the electronic device 101 may move the pointer 1401 based on a plurality of communication signals including the position information.

Referring to FIG. 14B, the electronic device 101 may be connected to a docking station 1420 and be connected to an external display device 1410 via the docking station 1420. However, connection via the docking station 1420 is merely an example, and the electronic device 101 may be connected directly to the external display device 1410 without an intervening device. The electronic device 101 may transmit the displayed screen to the external display device 1410. The electronic device 101 may transmit data for configuring the screen of processing result of the drag gesture to the external display device 1410. Thus, the external display device 1410 may move the position of the pointer 1411 according to the drag gesture. The external display device 1410 may display the screen including the drawing object 1413 and the pointer 1411 moved according to the processing result.

Accordingly, in the air mouse mode, the electronic device 101 may treat the movement of the stylus pen 201 as the movement of the pointer and treat the pressing and release of the button of the stylus pen 201 as a pressing and release of a legacy mouse button, but not limited thereto.

Figure 15A:
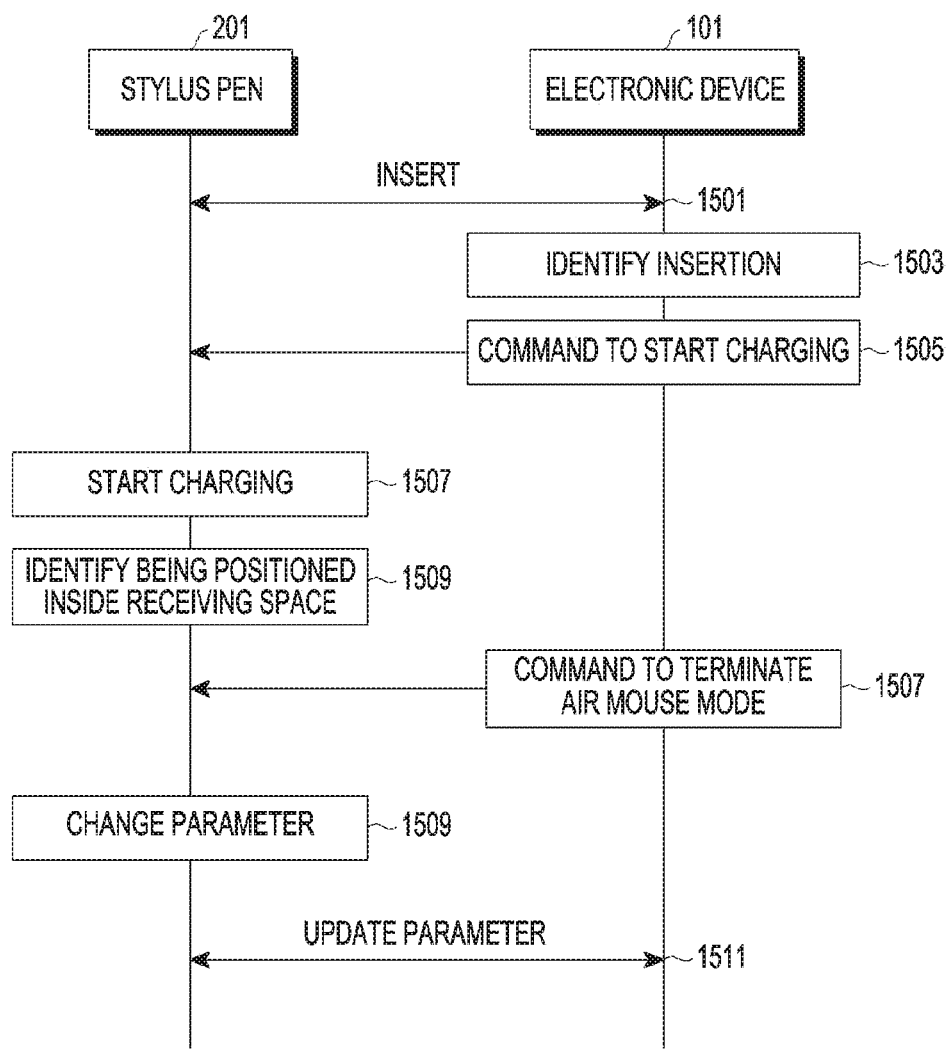
Figure 15B:
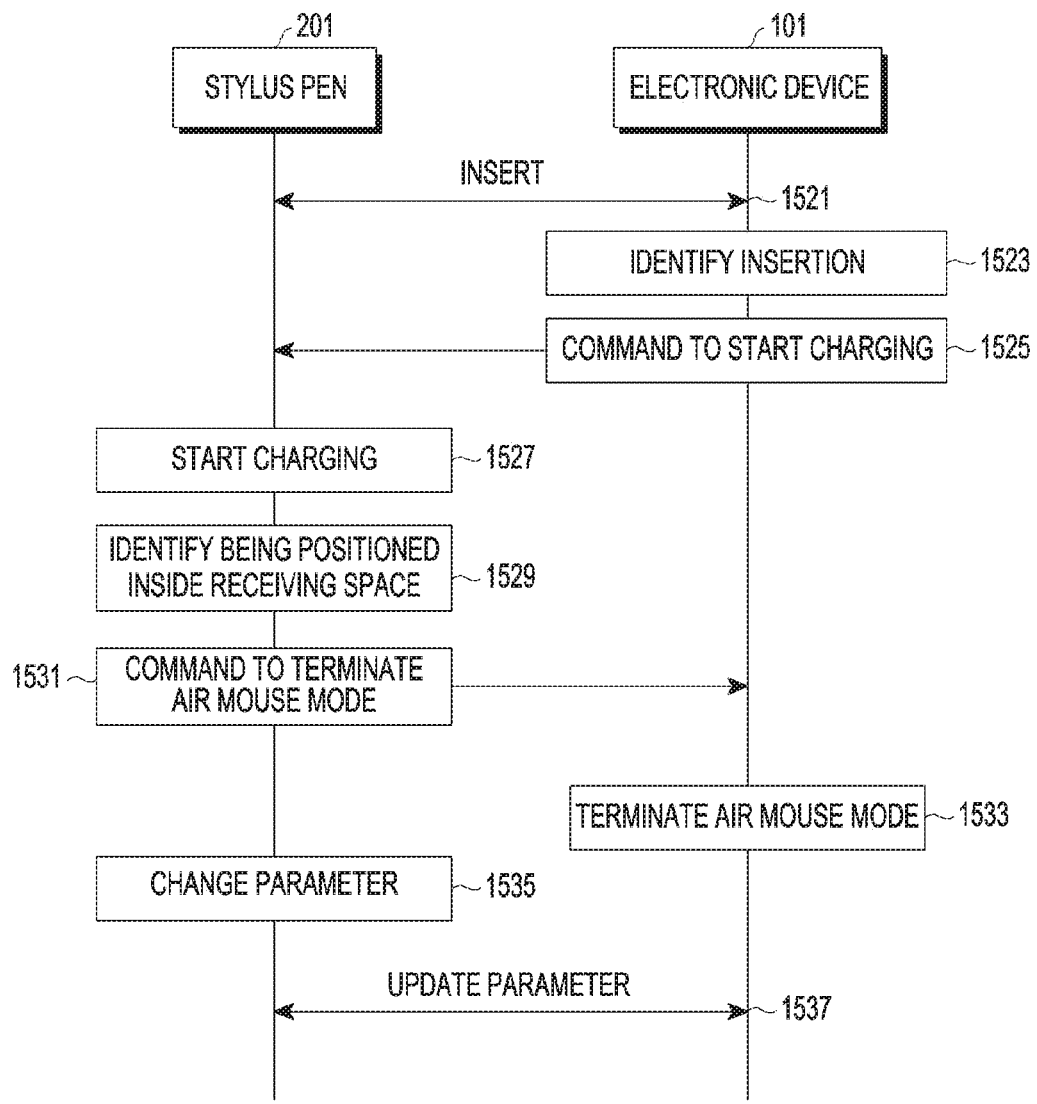

FIGS. 15A and 15B illustrate processes for terminating an air mouse according to various embodiments.

Referring to FIG. 15A, in operation 1501, the stylus pen 201 may be inserted into the electronic device 101. The electronic device 101 may identify the insertion of the stylus pen 201 in operation 1503 and may send a charge start command to the stylus pen 201 in operation 1505.

The stylus pen 201 may identify the charge start and start charging in operation 1507. In operation 1509, the stylus pen 201 may identify that the stylus pen 201 is positioned inside the receiving space.

In operation 1511, the electronic device 101 may command the stylus pen 201 to terminate the air mouse mode. The electronic device 101 may transmit a communication signal including information indicating the termination of the air mouse mode to the stylus pen 201 through the communication module. The electronic device 101 may also apply a signal with a pattern corresponding to the termination of the air mouse mode to the receiving space coil.

In operation 1513, the stylus pen 201 may terminate the air mouse mode.

The stylus pen 201 may change a parameter (e.g., a connection interval and/or slave latency) and notify the electronic device 101 of this.

In operation 1515, the stylus pen 201 and the electronic device 101 may update parameters. In FIG. 15A, the electronic device 101 may command the stylus pen 201 to terminate the air mouse mode.

Referring to FIG. 15B, steps operation 1521, operation 1523, operation. 1525, operation 1527, operation 1529, operation 1535, and operation 1537 are the same as operations 1501, 1503, 1505, 1507, 1509, 1513, and 1515 of FIG. 15A and have been described above. Therefore, no further description of these operations is given below.

In step 1531, the stylus pen 201 may terminate the air mouse mode based on identifying the position inside the receiving space. The stylus pen 201 may terminate the air mouse mode after waiting a predetermined period (e.g., five seconds) or, in another implementation example, the stylus pen 201 may terminate the air mouse mode without any waiting period.

The stylus pen 201 may notify the electronic device 101 of the termination of the air mouse mode, and the electronic device 101 may terminate the air mouse mode in step 1533. In FIG. 15B, the stylus pen 201 may command the electronic device 101 to terminate the air mouse mode, in which case unintentional termination of the air mouse mode as another stylus pen is inserted into the electronic device 101 may be prevented.

Figure 16:
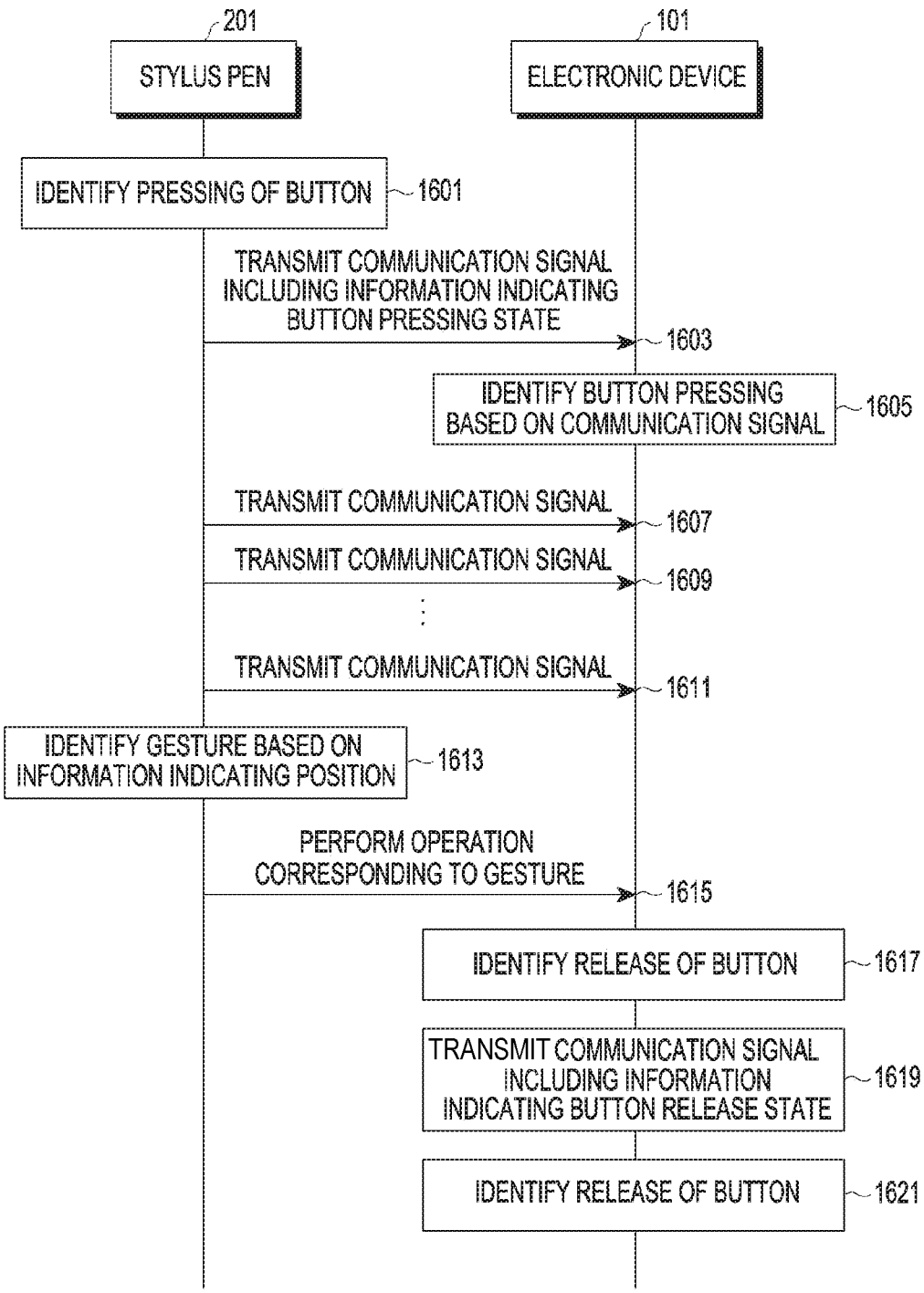
FIG. 16 illustrates a method of operating a stylus pen and an electronic device in a gesture mode according to an embodiment.

FIG. 16 illustrates a method of operating a stylus pen and an electronic device in a gesture mode according to an embodiment.

Referring to FIG. 16, the stylus pen 201 may identify a pressing of the button in operation 1601.

In operation 1603, the stylus pen 201 may transmit a communication signal including information indicating the button pressing state to the electronic device 101.

In step 1605, the electronic device 101 may identify a pressing of the button based on a communication signal.

In operation 1607, operation 1609, and operation 1611, the stylus pen 201 may transmit communication signals to the electronic device 101. Each of the communication signals may include information about the position of the stylus pen 201.

In operation 1613, the electronic device 101 may identify the gesture based on the information indicating the position. For example, the electronic device 101 may identify the moving trajectory of the coordinates according to the information indicating the position and identify the gesture corresponding to the moving trajectory. Although FIG. 16 illustrates that the electronic device 101 identifies the gesture before the button is released, this is merely an example and, upon identifying a button release, the electronic device 101 may perform the operation of identifying the gesture.

In operation 1615, the electronic device 101 may perform an operation corresponding to the gesture. Upon identifying the gesture based on the received information indicating the position, the electronic device 101 may use the same as a trigger and perform the operation corresponding to the gesture. Upon detecting a gesture while monitoring, in real-time, whether a gesture is detected, the electronic device 101 may use the same as a trigger and perform an operation corresponding to the gesture, A release of the button may be implemented as a trigger, and the kind of the trigger is not limited thereto. For example, upon identifying that the stylus pen 201 stops, the electronic device 101 may perform the operation corresponding to the gesture identified based on the position information before it stops.

In operation 1617, the stylus pen 201 may identify a release of the button. In operation 1619, the stylus pen 201 may transmit a communication signal including information indicating the button released state to the electronic device 101. In operation 1621, the electronic device 101 may identify a release of the button based on the information included in the communication signal. For example, the electronic device 101 may be configured to terminate the mode based on identification of the button release. As described above, the electronic device 101 may set the button release as a trigger for performing the operation corresponding to the gesture.

Figure 17:
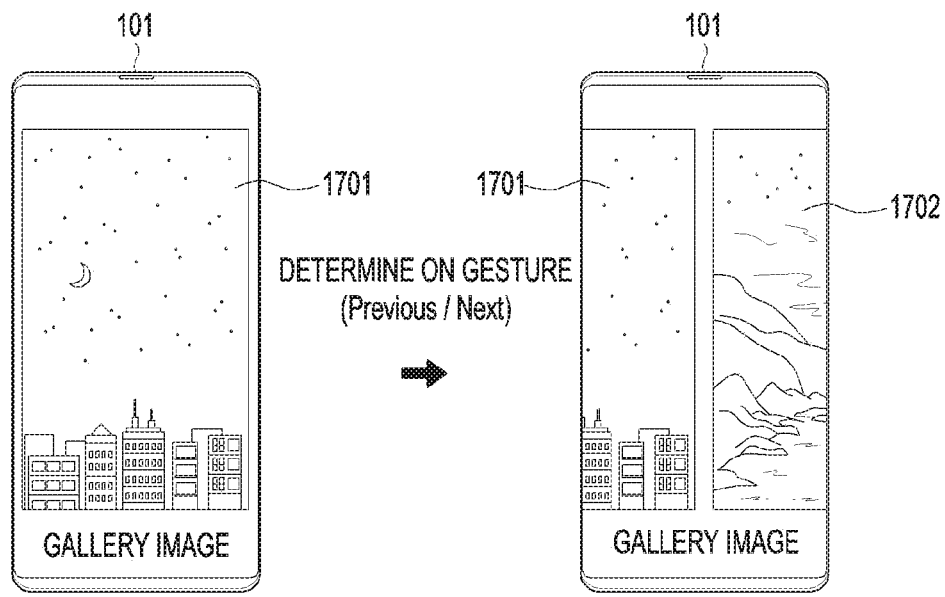
FIG. 17 illustrates a gesture mode according to an embodiment.
Figure 17:
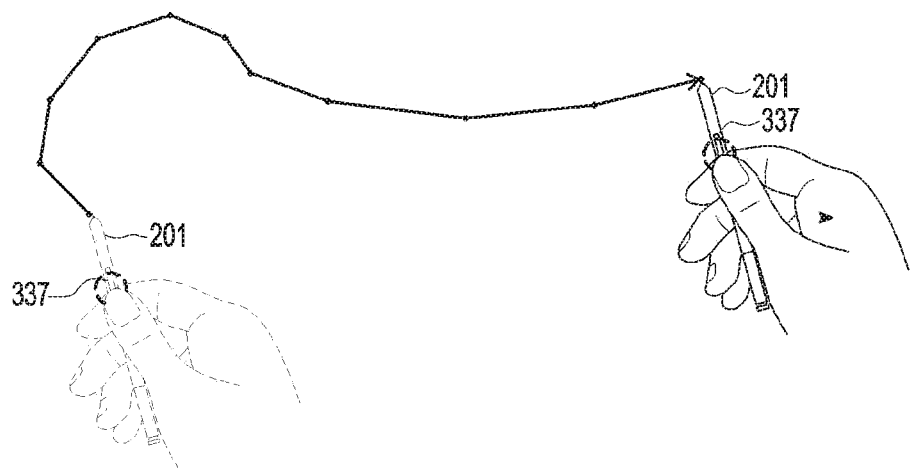

FIG. 17 illustrates a gesture mode according to an embodiment.

Referring to FIG. 17, the electronic device 101 may receive information about the position of a plurality of stylus pens 201 according to the movement of the stylus pen 201, with the button 337 pressed. The electronic device 101 may identify a circle gesture and a swipe gesture as candidate gestures and may finally select the swipe gesture. The electronic device 101 may identify that a function mapped to the swipe gesture in a Gallery application is a Gallery image switch. Thus, the electronic device 101 may switch a first image 1701, which is an execution screen of the Gallery application, into a screen including at least a portion of the first image and at least a portion of a second image 1702, and display the same. The electronic device 101 may then display the whole second image 1702 and thus perform an image switch.

The electronic device 101 may map operations corresponding to gestures per application and store them. For example, Table 1 below shows per-application functions mapped to gestures,

TABLE 1

| application | swipe up/down gesture | swipe left/right gesture | clockwise/counterclockwise gesture |
| --- | --- | --- | --- |
| camera | before capture, switch front-facing camera and rear-facing camera | before capture, switch modes while capturing, N/A | capturing on rear-facing camera zoom in/out |
| Gallery | identify detail/detail view | identify previous/next photo | add/remove bookmark |
| note | scroll up/down | switch mode tabs | convert/cancel handwritten text |
| Internet | scroll up/down | identify previous/next screen | renew |
| music | not set | previous/next track | volume up/down |
| Video player | not set | previous/next file | volume up/down |
| office | start presentation | turn page | run/end special function |

Referring to Table 1, the electronic device 101 may map a different function to the gesture for the state (e.g., the state before or while capturing) of one application (e.g., a camera application). For a specific application (e.g., a music application), no function may be mapped to a specific gesture (e.g., swipe up/down gesture). The electronic device 101 may also set a function for a global gesture which is not limited to an application.

Figure 18:
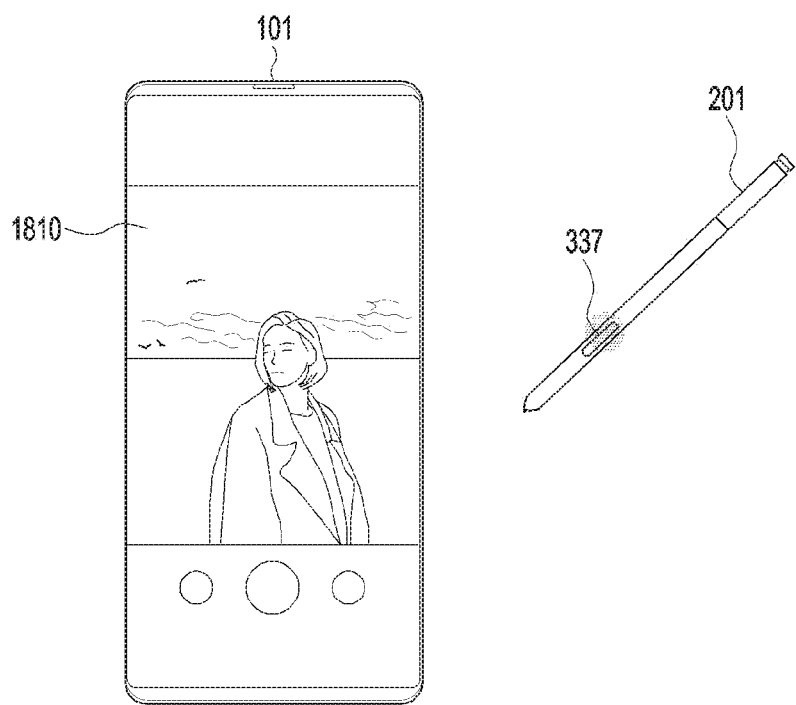
FIG. 18 illustrates an electronic device in a BLE mode according to an embodiment.

FIG. 18 illustrates operations of an electronic device in a. BLE mode according to an embodiment.

Referring to FIG. 18, the electronic device 101 may identify the BLE mode. For example, the electronic device 101 may receive a communication signal including information indicating a pressing of a button 337 from the stylus pen 201. The electronic device 101 may perform the operation corresponding to the pressing state of the button 337. Upon identifying a pressing of the button 337, the electronic device 101 may perform an operation (e.g., taking a selfie) mapped to the button pressing on an application running in the foreground. The electronic device 101 may store a preview image 1810.

Figure 19:
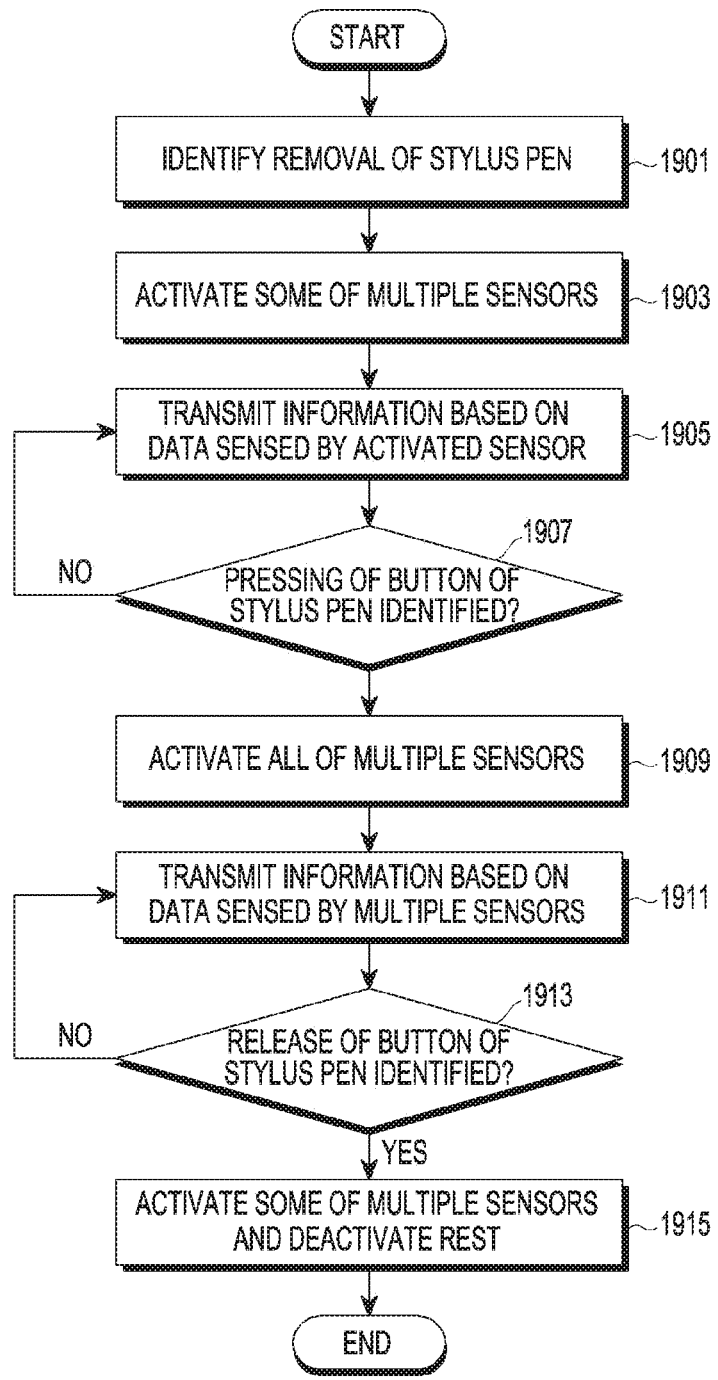
FIG. 19 illustrates a method of operating a stylus pen according to an embodiment.

FIG. 19 is a flowchart illustrating a method of operating a stylus pen according to an embodiment.

Referring to FIG. 19, in operation 1901, the stylus pen 201 may identify removal of the stylus pen 201. For example, the stylus pen 201 may identify removal of the stylus pen 201 based on the pattern and/or magnitude of a signal output from the resonance circuit. The stylus pen 201 may identify removal of the stylus pen 201 based on the information included in the communication signal from the electronic device 101.

In operation 1903, the stylus pen 201 may activate some of a plurality of sensors. The rest except for some of the plurality of sensors may remain in the inactive state. In operation 1905, the stylus pen 201 may transmit information based on data sensed by the activated sensor to the electronic device 101. For example, the stylus pen 201 may activate the accelerometer and transmit information sensed by the accelerometer or information obtained from the sensed information to the electronic device 101. The electronic device 101 may identify a two-dimensional gesture based on the acceleration sensing information and perform the operation corresponding to the gesture. The electronic device 101 may correct other information using the acceleration sensing information or may perform the operation identified using the other information and the acceleration sensing information together. Alternatively, the stylus pen 201 may be configured to use the information obtained using the accelerometer to identify the orientation of the stylus pen 201 and not to transmit it to the electronic device 101.

In step 1907, the stylus pen 201 may identify whether the button of the stylus pen 201 is pressed in operation 1907. Upon identifying that the button of the stylus pen 201 is pressed in step 1907, the stylus pen 201 may activate the inactive sensor in operation 1909. For example, the stylus pen 201 may activate the remaining sensor (e.g., the gyro sensor) that is in the inactive state.

In operation 1911, the stylus pen 201 may transmit information based on data sensed by a plurality of sensors to the electronic device 101. For example, the stylus pen 201 may identify information about the displacement of the stylus pen 201 based on rotation information by the gyro sensor and linear acceleration information by the accelerometer and transmit the same to the electronic device 101, The acceleration information obtained before the gyro sensor is activated may be used to identify the initial orientation of the stylus pen 201, and the stylus pen 201 may identify the displacement information with respect to the initial orientation. The displacement information may be represented in two dimensions or three dimensions and, besides the displacement information, coordinates information may also be calculated.

In operation 1913, the stylus pen 201 may identify whether the button of the stylus pen 201 is released. Upon identifying that the button is released in step 1913, the stylus pen 201 may activate some of the plurality of sensors and deactivate the other sensors in operation 1915.

Alternatively, the stylus pen 201 may be configured to activate all of the plurality of sensors upon identifying removal or upon identifying a pressing of the button, and the time of activation of each sensor is not limited thereto. As described above, as the sensors are activated differentially, power consumption may be reduced, and thus, the stylus pen 201 may be used for a longer time.

Upon detecting a long press of the button, the stylus pen 201 may enter the air mouse mode. Upon entering the air mouse mode, the stylus pen 201 may keep the plurality of sensors active despite detecting a release of the button. The stylus pen 201 may transmit information about the position using the plurality of activated sensors to the electronic device 101. Thereafter, when the air mouse mode is terminated, the stylus pen 201 may deactivate some sensors. Upon entering the gesture mode, the stylus pen 201 may deactivate some sensors when a release of the button is detected.

The stylus pen 201 may not activate the gyro sensor in the pen mode. In this case, although a pressing of the button is identified, the gyro sensor may not be activated.

The stylus pen 201 may perform calibration on at least one sensor. The sensor included in the stylus pen 201 may be calibrated periodically or as necessary, to mitigate errors that may be caused due to an environmental variation (e.g., external impacts, temperature, or humidity). The stylus pen 201 may perform self-calibration or calibration based on a command from the electronic device 101. The stylus pen 201, after being inserted into the electronic device 101, may perform calibration at designated periods (e.g., every four hours).

Alternatively, upon identifying that it is not under the user's use condition (e.g., when a variation in the sensor's sensing value is a threshold or less), the stylus pen 201 may perform calibration. The stylus pen 201 may store sensing data identified when it is under the use condition, such as an offset. The stylus pen 201 may perform calibration by correcting the sensing data sensed later with the offset. The stylus pen 201 may store the existing offset until a new offset is identified and use the stored offset for correction.

An Example 1 of the present disclosure may be an electronic device, which includes a panel configured to identify a position of a stylus pen, a communication module configured to transmit/receive a communication signal to/from the stylus pen, and at least one processor configured to, based on detection of the stylus pen by the panel, perform a first operation based on the position of the stylus pen identified by the panel, based on non-detection of the stylus pen by the panel, identify at least one of information about the position of the stylus pen included in at least one communication signal received through the communication module or information indicating whether a button of the stylus pen is pressed, from the stylus, and perform a second operation based on at least one of the information about the position of the stylus pen included in the received at least one communication signal or the information indicating whether the button of the stylus pen is pressed.

An Example 2 may be an electronic device in accordance with Example 1, or with any other example described herein, which includes a display, wherein the at least one processor may be configured to, based on non-detection of the stylus pen by the panel, identify a first processing scheme based on at least one first communication signal among the at least one communication signal and control the display to display a pointer, and change a position of the pointer, based on the information about the position of the stylus pen included in at least one second communication signal among the at least one communication signal, based on the first processing scheme.

An Example 3 may be an electronic device in accordance with Example 1, or Example 2, or with any other example described herein, wherein, the at least one processor may be configured to identify the first processing scheme, based on identification of a long press of the button of the stylus pen based on the at least one first communication signal.

An Example 4 may be an electronic device in accordance with Examples 1 to 3, or with any other example described herein, wherein, the at least one processor may be configured to perform an operation mapped to a mouse click function, based on at least one third communication signal among the at least one communication signal, based on the first processing scheme.

An Example 5 may be an electronic device in accordance with Examples 1 to 4, or with any other example described herein, wherein, the at least one processor may be configured to, upon identifying a termination event of the first processing scheme, terminate the first processing scheme and control the communication module to transmit a communication signal including information indicating the termination of the first processing scheme to the stylus pen or upon receiving, through the communication module, the communication signal including the information indicating the termination of the first processing scheme from the stylus pen, terminate the first processing scheme.

An Example 6 may be an electronic device in accordance with Examples 1 to 5, or with any other example described herein, wherein, the at least one processor may be configured to, based on non-detection of the stylus pen by the panel, identify a second processing scheme based on at least one fourth communication signal among the at least one communication signal, identify a gesture, based on the information about the position of the stylus pen included in at least one fifth communication signal among the at least one communication signal, based on the second processing scheme, and perform an operation mapped to the gesture.

An Example 7 may be an electronic device in accordance with Examples 1 to 6, or with any other example described herein, wherein, the at least one processor may be configured to identify an application to which the gesture is to be assigned, based on the second processing scheme and perform the operation mapped to the gesture on the identified application.

An Example 8 may be an electronic device in accordance with Examples 1 to 7, or with any other example described herein, wherein, the at least one processor may be configured to identify a pressing of the button of the stylus pen based on the at least one fourth communication signal, based on the second processing scheme, identify the gesture based on the information about the position of the stylus pen included in the at least one fifth communication signal, receive, through the communication module, at least one sixth communication signal among the at least one communication signal, after receiving the at least one fifth communication signal, and terminate the second processing scheme based on identification of a release of the button of the stylus pen based on the at least one sixth communication signal.

An Example 9 may be an electronic device in accordance with Examples 1 to 8, or with any other example described herein, wherein, the at least one processor may be configured to, based on non-detection of the stylus pen by the panel, perform an operation corresponding to manipulation information for the button of the stylus pen included in at least one seventh communication signal among the at least one communication signal.

An Example 10 may be an electronic device in accordance with Examples 1 to 9, or with any other example described herein, wherein, the at least one processor may be configured to, based on detection of the stylus pen by the panel, identify whether the button of the stylus pen is pressed, based on a frequency of a reception signal generated from the stylus pen identified on the panel, and perform the first operation based on whether the button of the stylus pen is pressed and the position of the stylus pen.

An Example 11 of the present disclosure may be a stylus pen, which includes a button, a resonance circuit including a coil and at least one capacitor, at least one sensor configured to sense at least one of a movement of the stylus pen, an orientation of the stylus pen, or a direction of the stylus pen, a communication module, and at least one control circuit configured to, based on non-identification of a transmission signal from a panel of an electronic device, identify whether the button is pressed, identify information about a position of the stylus pen based on data sensed by the at least one sensor, based on a pressing of the button, and control the communication module to transmit at least one communication signal including at least one of information about the position of the stylus pen or information indicating whether the button is pressed, and wherein upon identifying the transmission signal from the panel of the electronic device, the at least one communication signal may not be transmitted.

An Example 12 may be a stylus pen in accordance with Example 11, or with any other example described herein, wherein, the at least one control circuit may be configured to, based on the transmission signal from the panel of the electronic device being not identified and, after at least a portion of the at least one communication signal is transmitted, the transmission signal being identified, maintain transmission of another portion of the at least one communication signal.

An Example 13 may be a stylus pen in accordance with Example 11 or Example 12, or with any other example described herein, wherein, the at least one control circuit may be configured to refrain from transferring the information about whether the button is pressed to the communication module when the transmission signal from the panel of the electronic device is identified.

An Example 14 may be a stylus pen in accordance with Examples 11 to 13, or with any other example described herein, wherein, the at least one control circuit may be configured to identify a first processing scheme of the at least one communication signal and control the communication module to transmit information about at least one time-series position identified based on sensing data identified by the at least one sensor after the first processing scheme is identified, based on the first processing scheme.

An Example 15 may be a stylus pen in accordance with Examples 11 to 14, or with any other example described herein, wherein, the at least one control circuit may be configured to identify the first processing scheme based on identification of a long press of the button.

An Example 16 may be a stylus pen in accordance with Examples 11 to 15, or with any other example described herein, wherein, the at least one control circuit may be configured to control the communication module to transmit a communication signal including information indicating at least one of a pressing of the button or a release of the button after the first processing scheme is identified, based on the first processing scheme.

An Example 17 may be a stylus pen in accordance with Examples 11 to 16, or with any other example described herein, wherein, the at least one control circuit may be configured to, upon identifying a termination event of the first processing scheme, terminate the first processing scheme and control the communication module to transmit a communication signal including information indicating the termination of the first processing scheme to the electronic device or upon receiving, through the communication module, the communication signal including the information indicating the termination of the first processing scheme from the electronic device, terminate the first processing scheme.

An Example 18 may be a stylus pen in accordance with Examples 11 to 17, or with any other example described herein, wherein, the at least one control circuit may be configured to activate all of the at least one sensor while the first processing scheme is applied and before the first processing scheme is applied and after the first processing scheme has been terminated, deactivate some of the at least one sensor.

An Example 19 may be a stylus pen in accordance with Examples 11 to 18, or with any other example described herein, wherein, the at least one control circuit may be configured to identify a second processing scheme of a communication signal from the stylus pen and control the communication module to transmit information about at least one time-series position identified based on sensing data identified by the at least one sensor after the second processing scheme is identified, until a termination event of the second processing scheme is detected, based on the second processing scheme.

An Example 20 may be a stylus pen in accordance with Examples 11 to 19, or with any other example described herein, wherein, the at least one control circuit may be configured to identify the second processing scheme based on identification of a pressing of the button and detect the termination event of the second processing scheme based on identification of a release of the button.

An Example 21 of the present disclosure may be an electronic device, wherein the electronic device comprises a sensing means (e.g., the sensing panel 503) configured to identify a position of a stylus pen, a communication means (e.g., the communication module 190) configured to transmit/receive a communication signal to/from the stylus pen, and processing means (e.g., the processor 120) configured to, based on detection of the stylus pen by the sensing means (e.g., the sensing panel 503), perform a first operation based on the position of the stylus pen identified by the sensing means (e.g., the sensing panel 503), based on non-detection of the stylus pen by the sensing means (e.g., the sensing panel 503), identify at least one of information about the position of the stylus pen included in at least one communication signal received through the communication means (e.g., the communication module 190) or information indicating whether a button of the stylus pen is pressed, from the stylus pen, and perform a second operation based on at least one of the information about the position of the stylus pen included in the received at least one communication signal or the information indicating whether the button of the stylus pen is pressed.

An Example 22 may be an electronic device in accordance with example 21, or with any other example described herein, wherein, the electronic device may further comprise a display means (e.g., the display device 160), wherein the processing means (e.g., the processor 120) may be configured to, based on non-detection of the stylus pen by the sensing means (e.g., the sensing panel 503), identify a first processing scheme based on at least one first communication signal among the at least one communication signal and control the display means (e.g., the display device 160) to display a pointer, and change a position of the pointer, based on the information about the position of the stylus pen included in at least one second communication signal among the at least one communication signal, based on the first processing scheme.

An Example 23 may be an electronic device in accordance with example 21, or example 2, or with any other example described herein, wherein, the processing means (e.g., the processor 120) may be configured to identify the first processing scheme, based on identification of a long press of the button of the stylus pen based on the at least one first communication signal.

An Example 24 may be an electronic device in accordance with example 21 to example 23, or with any other example described herein, wherein, the processing means (e.g., the processor 120) may be configured to perform an operation mapped to a mouse click function, based on at least one third communication signal among the at least one communication signal, based on the first processing scheme.

An Example 25 may be an electronic device in accordance with example 21 to example 24, or with any other example described herein, wherein, the processing means (e.g., the processor 120) may be configured to, upon identifying a termination event of the first processing scheme, terminate the first processing scheme and control the communication means (e.g., the communication module 190) to transmit a communication signal including information indicating the termination of the first processing scheme to the stylus pen or upon receiving, through the communication means (e.g., the communication module 190), the communication signal including the information indicating the termination of the first processing scheme from the stylus pen, terminate the first processing scheme.

An Example 26 may be an electronic device in accordance with example 21 to example 25, or with any other example described herein, wherein, the processing means (e.g., the processor 120) may be configured to, based on non-detection of the stylus pen by the sensing means (e.g., the sensing panel 503), identify a second processing scheme based on at least one fourth communication signal among the at least one communication signal, identify a gesture, based on the information about the position of the stylus pen included in at least one fifth communication signal among the at least one communication signal, based on the second processing scheme, and perform an operation mapped to the gesture.

An Example 27 may be an electronic device in accordance with example 21 to example 26, or with any other example described herein, wherein, the processing means (e.g., the processor 120) may be configured to identify an application to which the gesture is to be assigned, based on the second processing scheme and perform the operation mapped to the gesture on the identified application.

An Example 28 may be an electronic device in accordance with example 21 to example 27, or with any other example described herein, wherein, the processing means (e.g., the processor 120) may be configured to identify a pressing of the button of the stylus pen based on the at least one fourth communication signal, based on the second processing scheme, identify the gesture based on the information about the position of the stylus pen included in the at least one fifth communication signal, receive, through the communication means (e.g., the communication module 190), at least one sixth communication signal among the at least one communication signal, after receiving the at least one fifth communication signal, and terminate the second processing scheme based on identification of a release of the button of the stylus pen based on the at least one sixth communication signal.

An Example 29 may be an electronic device in accordance with example 21 to example 28, or with any other example described herein, wherein, the processing means (e.g., the processor 120) may be configured to, based on non-detection of the stylus pen by the sensing means (e.g., the sensing panel 503), perform an operation corresponding to manipulation information for the button of the stylus pen included in at least one seventh communication signal among the at least one communication signal.

An Example 30 may be an electronic device in accordance with example 21 to example 29, or with any other example described herein, wherein, the processing means (e.g., the processor 120) may be configured to, based on detection of the stylus pen by the sensing means (e.g., the sensing panel 503), identify whether the button of the stylus pen is pressed, based on a frequency of a reception signal generated from the stylus pen identified on the sensing means (e.g., the sensing panel 503), and perform the first operation based on whether the button of the stylus pen is pressed and the position of the stylus pen.

An Example 31 of the present disclosure may be a stylus pen, wherein, a stylus pen comprises a button, a resonance means (e.g., the resonance circuit 287) including a coil and at least one capacitor, at least one sensing means (e.g., the sensor 299) configured to sense at least one of a movement of the stylus pen, an Orientation of the stylus pen, or a direction of the stylus pen, a communication means (e.g., the communication circuit 290), and at least one processing means (e.g., the processor 220) configured to, based on non-identification of a transmission signal from a sensing means (e.g., the sensing panel 503) of an electronic device (e.g., the electronic device 101), identify whether the button is pressed, identify information about a position of the stylus pen based on data sensed by the at least one sensing means (e.g., the sensor 299), based on a pressing of the button, and control the communication module (e.g., the communication circuit 290) to transmit at least one communication signal including at least one of information about the position of the stylus pen or information indicating whether the button is pressed, and wherein upon identifying the transmission signal from the sensing means of the electronic device, the at least one communication signal may not be transmitted.

An Example 32 may be a stylus pen in accordance with example 31, or with any other example described herein, wherein, the at least one ### processing means (e.g., the processor 220) may be configured to, based on the transmission signal from the sensing means of the electronic device being not identified and, after at least a portion of the at least one communication signal is transmitted, the transmission signal being identified, maintain transmission of another portion of the at least one communication signal.

An Example 33 may be a stylus pen in accordance with example 31, example 32, or with any other example described herein, wherein, the at least one processing means (e.g., the processor 220) may be configured to refrain from transferring the information about whether the button is pressed to the communication means (e.g., the communication circuit 290) when the transmission signal from the sensing means (e.g., the sensing panel 503) of the electronic device is identified.

An Example 34 may be a stylus pen in accordance with example 31 to example 33, or with any other example described herein, wherein, the at least one processing means (e.g., the processor 220) may be configured to identify a first processing scheme of the at least one communication signal and control the communication means (e.g., the communication circuit 290) to transmit information about at least one time-series position identified based on sensing data identified by the at least one sensing means (e.g., the sensor 299) after the first processing scheme is identified, based on the first processing scheme.

An Example 35 may be a stylus pen in accordance with example 31 to example 34, or with any other example described herein, wherein, the at least one processing means (e.g., the processor 220) may be configured to identify the first processing scheme based on identification of a long press of the button (e.g., the button 337).

An Example 36 may be a stylus pen in accordance with example 31 to example 35, or with any other example described herein, wherein, the at least one processing means (e.g., the processor 220) may be configured to control the communication means (e.g., the communication circuit 290) to transmit a communication signal including information indicating at least one of a pressing of the button or a release of the button after the first processing scheme is identified, based on the first processing scheme.

An Example 37 may be a stylus pen in accordance with example 31 to example 36, or with any other example described herein, wherein, the at least one processing means (e.g., the processor 220) may be configured to, upon identifying a termination event of the first processing scheme, terminate the first processing scheme and control the communication means (e.g., the communication circuit 290) to transmit a communication signal including information indicating the termination of the first processing scheme to the electronic device or upon receiving, through the communication means (e.g., the communication circuit 290), the communication signal including the information indicating the termination of the first processing scheme from the electronic device, terminate the first processing scheme.

An Example 38 may be a stylus pen in accordance with example 31 to example 37, or with any other example described herein, wherein, the at least one processing means (e.g., the processor 220) may be configured to activate all of the at least one sensing means (e.g., the sensor 299) while the first processing scheme is applied and before the first processing scheme is applied and after the first processing scheme has been terminated, deactivate some of the at least one sensing means (e.g., the sensor 299).

An Example 39 may be a stylus pen in accordance with example 31 to example 38, or with any other example described herein, wherein, the at least one processing means (e.g., the processor 220) may be configured to identify a second processing scheme of a communication signal from the stylus pen and control the communication means (e.g., the communication circuit 290) to transmit information about at least one time-series position identified based on sensing data identified by the at least one sensing means (e.g., the sensor 299) after the second processing scheme is identified, until a termination event of the second processing scheme is detected, based on the second processing scheme.

An Example 40 may be a stylus pen in accordance with example 31 to example 39, or with any other example described herein, wherein, the at least one processing means (e.g., the processor 220) may be configured to identify the second processing scheme based on identification of a pressing of the button and detect the termination event of the second processing scheme based on identification of a release of the button.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions.

For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component in such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

While the present disclosure has been shown and described with reference to certain embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
a panel configured to identify a position of a stylus pen;
a communication module configured to transmit and receive communication signals to and from the stylus pen; and
at least one processor configured to:
based on detection of the stylus pen using the panel, perform a first operation based on the position of the stylus pen identified using the panel;
based on non-detection of the stylus pen using the panel after the stylus pen is removed from an inside of the electronic device:
identify, from at least one communication signal received through the communication module from the stylus pen, information about the position of the stylus pen and information indicating whether a button of the stylus pen is pressed, and
perform a second operation based on a movement of the stylus pen while the button of the stylus pen is pressed; and
based on insertion of the stylus pen into the inside of the electronic device while a communication connection between the electronic device and the stylus pen is not established:
establish the communication connection between the electronic device and the stylus pen based on receipt of an advertisement signal broadcast from the stylus pen.

2. The electronic device of claim 1, further comprising a display,
wherein the at least one processor is configured to, based on non-detection of the stylus pen:
identify a first processing scheme based on at least one first communication signal received through the communication module from the stylus pen,
display a pointer on the display, and
change a position of the pointer, based on information about the position of the stylus pen included in a second communication signal received through the communication module from the stylus pen based on the first processing scheme.

3. The electronic device of claim 2, wherein the at least one processor is configured to identify the first processing scheme, based on an indication of a long press of the button of the stylus pen based on the at least one first communication signal.

4. The electronic device of claim 2, wherein the at least one processor is further configured to perform an operation mapped to a mouse click function, based on at least one third communication signal received through the communication module from the stylus pen based on the first processing scheme.

5. The electronic device of claim 2, wherein the at least one processor is further configured to:
upon identifying a termination event of the first processing scheme, terminate the first processing scheme and control the communication module to transmit, to the stylus pen, a communication signal including information indicating the termination of the first processing scheme, or
upon receiving, from the stylus pen, through the communication module, a communication signal including information indicating the termination of the first processing scheme, terminate the first processing scheme.

6. The electronic device of claim 1, wherein the at least one processor is further configured to, based on non-detection of the stylus pen:
identify a second processing scheme based on at least one fourth communication signal received through the communication module from the stylus pen,
identify, based on the second processing scheme, a gesture, based on the information about the position of the stylus pen included in at least one fifth communication signal received through the communication module from the stylus pen, and
perform an operation mapped to the gesture.

7. The electronic device of claim 6, wherein the at least one processor is further configured to:
identify an application to which the gesture is to be assigned, based on the second processing scheme and
perform the operation mapped to the gesture on the identified application.

8. The electronic device of claim 6, wherein the at least one processor is further configured to:
identify a pressing of the button of the stylus pen based on the at least one fourth communication signal, based on the second processing scheme,
identify the gesture based on the information about the position of the stylus pen included in the at least one fifth communication signal,
receive, from the stylus pen, through the communication module, at least one sixth communication signal, after receiving the at least one fifth communication signal, and
terminate the second processing scheme based on an indication of a release of the button of the stylus pen based on the at least one sixth communication signal.

9. The electronic device of claim 1, wherein the at least one processor is further configured to, based on non-detection of the stylus pen by the panel, perform an operation corresponding to manipulation information for the button of the stylus pen included in at least one seventh communication signal received through the communication module from the stylus pen.

10. The electronic device of claim 1, wherein the at least one processor is configured to, based on detection of the stylus pen:
identify whether the button of the stylus pen is pressed, based on a frequency of a reception signal generated from the stylus pen identified on the panel, and
perform the first operation based on whether the button of the stylus pen is pressed and the position of the stylus pen.

11. A stylus pen, comprising:
a button;
a resonance circuit including a coil and at least one capacitor;
at least one sensor configured to sense at least one of a movement of the stylus pen, an orientation of the stylus pen, or a direction of the stylus pen;
a communication module; and
at least one control circuit configured to:
based on non-identification of a transmission signal from a panel of an electronic device, identify whether the button is pressed,
identify information about a position of the stylus pen based on data sensed using the at least one sensor, based on a pressing of the button,
control the communication module to transmit at least one communication signal including information about the position of the stylus pen and information indicating whether the button is pressed, and
control a reset operation,
wherein upon identifying the transmission signal from the panel of the electronic device, the at least one communication signal is not transmitted, and
wherein, after the reset operation is performed, the electronic device identifies insertion therein of the stylus pen based on receipt from the stylus pen of an advertisement signal.

12. The stylus pen of claim 11, wherein the at least one control circuit is configured to, based on the transmission signal from the panel of the electronic device being not identified and, after at least a portion of the at least one communication signal is transmitted, the transmission signal being identified, maintain transmission of another portion of the at least one communication signal.

13. The stylus pen of claim 11, wherein the at least one control circuit, upon identifying a transmission signal from the panel of the electronic device, is further configured to:
refrain from transferring the information about whether the button is pressed to the communication module.

14. The stylus pen of claim 11, wherein the at least one control circuit is further configured to:
identify a first processing scheme for processing the at least one communication signal, and
control the communication module to transmit information about at least one time-series position identified based on sensing data identified using the at least one sensor after the first processing scheme is identified, based on the first processing scheme.

15. The stylus pen of claim 14, wherein the at least one control circuit is further configured to identify the first processing scheme based on identification of a long press of the button.

16. The stylus pen of claim 14, wherein the at least one control circuit is further configured to control the communication module to transmit a communication signal including information indicating at least one of a pressing of the button or a release of the button after the first processing scheme is identified, based on the first processing scheme.

17. The stylus pen of claim 14, wherein the at least one control circuit is further configured to:
upon identifying a termination event of the first processing scheme, terminate the first processing scheme and control the communication module to transmit a communication signal including information indicating the termination of the first processing scheme to the electronic device, or
upon receiving, from the electronic device, through the communication module, a communication signal including information indicating the termination of the first processing scheme, terminate the first processing scheme.

18. The stylus pen of claim 17,
wherein the at least one control circuit is further configured to:
activate all of the at least one sensor while the first processing scheme is applied, and
after the first processing scheme has been terminated, deactivate some of the at least one sensor.

19. The stylus pen of claim 11, wherein the at least one control circuit is further configured to:
identify a second processing scheme for processing a communication signal from the stylus pen, and control the communication module to transmit information about at least one time-series position identified based on sensing data identified using the at least one sensor after the second processing scheme is identified, until a termination event of the second processing scheme is detected, based on the second processing scheme.

20. The stylus pen of claim 19, wherein the at least one control circuit is further configured to:
identify the second processing scheme based on a pressing of the button, and detect the termination event of the second processing scheme based on a release of the button.

* * * * *